US008953924B2

(12) United States Patent
Cote et al.

(10) Patent No.: US 8,953,924 B2
(45) Date of Patent: Feb. 10, 2015

(54) REMOVABLE STRAIN RELIEF BRACKETS FOR SECURING FIBER OPTIC CABLES AND/OR OPTICAL FIBERS TO FIBER OPTIC EQUIPMENT, AND RELATED ASSEMBLIES AND METHODS

(75) Inventors: Monique Lise Cote, Fort Worth, TX (US); Brent Michael Frazier, Haslet, TX (US); William Julius McPhil Giraud, Azle, TX (US); Raymond Glenn Jay, Mansfield, TX (US); Michael Heath Rasmussen, Keller, TX (US)

(73) Assignee: Corning Cable Systems LLC, Hickory, NC (US)

( * ) Notice: Subject to any disclaimer, the term of this patent is extended or adjusted under 35 U.S.C. 154(b) by 58 days.

(21) Appl. No.: 13/597,549

(22) Filed: Aug. 29, 2012

(65) Prior Publication Data
US 2013/0058616 A1   Mar. 7, 2013

Related U.S. Application Data

(60) Provisional application No. 61/530,675, filed on Sep. 2, 2011.

(51) Int. Cl.
   *G02B 6/00* (2006.01)
   *G02B 6/44* (2006.01)
(52) U.S. Cl.
   CPC .................................. *G02B 6/4471* (2013.01)
   USPC ............................ 385/137; 385/135; 385/136
(58) Field of Classification Search
   CPC ..................................................... G02B 6/4471
   USPC ................................................... 385/136, 137
   See application file for complete search history.

(56) References Cited

U.S. PATENT DOCUMENTS

| 620,013 | A | 2/1899 | Barnes |
| 2,528,910 | A | 11/1950 | Poe |
| 2,614,685 | A | 10/1952 | Miller |
| 3,081,717 | A | 3/1963 | Yurevich |
| 3,175,873 | A | 3/1965 | Blomquist et al. |
| 3,212,192 | A | 10/1965 | Bachmann et al. |

(Continued)

FOREIGN PATENT DOCUMENTS

| CA | 2029592 A1 | 5/1992 |
| CA | 2186314 A1 | 4/1997 |

(Continued)

OTHER PUBLICATIONS

Non-final Office Action for U.S. Appl. No. 12/956,475 mailed Oct. 4, 2012, 7 pages.

(Continued)

*Primary Examiner* — Ryan Lepisto

(57) ABSTRACT

Removable strain relief brackets for securing fiber optic cables and/or optical fiber to fiber optic equipment, and related assemblies and methods are disclosed. The removable strain relief brackets may be employed to secure fiber optic cable and/or optical fibers routed to fiber optic equipment. The removable strain relief brackets may also be employed to provide strain relief for fiber optic cable and/or optical fibers routed and secure to fiber optic equipment. Fiber optic cable discussed herein includes optical fiber whether disposed in a common cable jacket or disposed freely of each other outside a cable jacket.

42 Claims, 14 Drawing Sheets

(56) References Cited

U.S. PATENT DOCUMENTS

| | | |
|---|---|---|
| 3,433,886 A | 3/1969 | Myers |
| 3,494,306 A | 2/1970 | Aguilar |
| 3,545,712 A | 12/1970 | Ellis |
| 3,568,263 A | 3/1971 | Meehan |
| 3,646,244 A | 2/1972 | Cole |
| 3,664,514 A | 5/1972 | Drake |
| 3,683,238 A | 8/1972 | Olds et al. |
| 3,701,835 A | 10/1972 | Eisele et al. |
| 3,880,396 A | 4/1975 | Freiberger et al. |
| 3,906,592 A | 9/1975 | Sakasegawa et al. |
| 3,991,960 A | 11/1976 | Tanaka |
| 4,047,797 A | 9/1977 | Arnold et al. |
| 4,059,872 A | 11/1977 | Delesandri |
| 4,119,285 A | 10/1978 | Bisping et al. |
| 4,148,454 A | 4/1979 | Carlson et al. |
| 4,239,316 A | 12/1980 | Spaulding |
| 4,244,638 A | 1/1981 | Little et al. |
| 4,285,486 A | 8/1981 | Von Osten et al. |
| 4,303,296 A | 12/1981 | Spaulding |
| 4,354,731 A | 10/1982 | Mouissie |
| 4,457,482 A | 7/1984 | Kitagawa |
| 4,525,012 A | 6/1985 | Dunner |
| 4,540,222 A | 9/1985 | Burrell |
| 4,561,615 A | 12/1985 | Medlin, Jr. |
| 4,564,163 A | 1/1986 | Barnett |
| 4,597,173 A | 7/1986 | Chino et al. |
| 4,611,875 A | 9/1986 | Clarke et al. |
| 4,635,886 A | 1/1987 | Santucci et al. |
| 4,645,292 A | 2/1987 | Sammueller |
| 4,657,340 A | 4/1987 | Tanaka et al. |
| 4,681,288 A | 7/1987 | Nakamura |
| 4,702,551 A | 10/1987 | Coulombe |
| 4,711,518 A | 12/1987 | Shank et al. |
| 4,736,100 A | 4/1988 | Vastagh |
| 4,744,629 A | 5/1988 | Bertoglio et al. |
| 4,747,020 A | 5/1988 | Brickley et al. |
| 4,752,110 A | 6/1988 | Blanchet et al. |
| 4,753,510 A | 6/1988 | Sezerman |
| 4,787,706 A | 11/1988 | Cannon, Jr. et al. |
| 4,792,203 A | 12/1988 | Nelson et al. |
| 4,798,432 A | 1/1989 | Becker et al. |
| 4,805,979 A | 2/1989 | Bossard et al. |
| 4,808,774 A | 2/1989 | Crane |
| 4,824,193 A | 4/1989 | Maeda et al. |
| 4,824,196 A | 4/1989 | Bylander |
| 4,826,277 A | 5/1989 | Weber et al. |
| 4,838,643 A | 6/1989 | Hodges et al. |
| 4,840,449 A | 6/1989 | Ghandeharizadeh |
| 4,865,280 A | 9/1989 | Wollar |
| 4,898,448 A | 2/1990 | Cooper |
| 4,900,123 A | 2/1990 | Barlow |
| 4,911,662 A | 3/1990 | Debortoli et al. |
| 4,948,220 A | 8/1990 | Violo et al. |
| 4,949,376 A | 8/1990 | Nieves et al. |
| 4,971,421 A | 11/1990 | Ori |
| 4,986,625 A | 1/1991 | Yamada et al. |
| 4,988,831 A | 1/1991 | Wilson et al. |
| 4,991,928 A | 2/1991 | Zimmer |
| 4,995,688 A | 2/1991 | Anton et al. |
| 5,001,602 A | 3/1991 | Suffi et al. |
| 5,005,941 A | 4/1991 | Barlow et al. |
| 5,017,211 A | 5/1991 | Wenger et al. |
| 5,023,646 A | 6/1991 | Ishida et al. |
| 5,024,498 A | 6/1991 | Becker et al. |
| 5,028,114 A | 7/1991 | Krausse et al. |
| 5,037,175 A | 8/1991 | Weber |
| 5,048,918 A | 9/1991 | Daems et al. |
| 5,060,897 A | 10/1991 | Thalenfeld |
| 5,066,149 A | 11/1991 | Wheeler et al. |
| 5,067,784 A | 11/1991 | Debortoli et al. |
| 5,071,211 A | 12/1991 | Debortoli et al. |
| 5,071,220 A | 12/1991 | Ruello et al. |
| 5,073,042 A | 12/1991 | Mulholland et al. |
| 5,074,635 A | 12/1991 | Justice et al. |
| 5,076,688 A | 12/1991 | Bowen et al. |
| 5,080,459 A | 1/1992 | Wettengel et al. |
| 5,100,221 A | 3/1992 | Carney et al. |
| 5,104,336 A | 4/1992 | Hatanaka et al. |
| 5,125,060 A | 6/1992 | Edmundson |
| 5,127,082 A | 6/1992 | Below et al. |
| 5,127,851 A | 7/1992 | Hilbert et al. |
| 5,129,030 A | 7/1992 | Petrunia |
| 5,129,607 A | 7/1992 | Satoh |
| 5,133,039 A | 7/1992 | Dixit |
| 5,138,678 A | 8/1992 | Briggs et al. |
| 5,138,688 A | 8/1992 | Debortoli |
| 5,142,598 A | 8/1992 | Tabone |
| 5,142,607 A | 8/1992 | Petrotta et al. |
| 5,150,277 A | 9/1992 | Bainbridge et al. |
| D330,368 S | 10/1992 | Bourgeois et al. |
| 5,152,760 A | 10/1992 | Latina |
| 5,153,910 A | 10/1992 | Mickelson et al. |
| 5,157,749 A | 10/1992 | Briggs et al. |
| 5,167,001 A | 11/1992 | Debortoli et al. |
| 5,170,452 A | 12/1992 | Ott |
| 5,189,723 A | 2/1993 | Johnson et al. |
| 5,199,099 A | 3/1993 | Dalgoutte |
| 5,204,929 A | 4/1993 | Machall et al. |
| 5,209,572 A | 5/1993 | Jordan |
| 5,214,735 A | 5/1993 | Henneberger et al. |
| 5,224,186 A | 6/1993 | Kishimoto et al. |
| 5,230,492 A | 7/1993 | Zwart et al. |
| 5,231,687 A | 7/1993 | Handley |
| 5,231,688 A | 7/1993 | Zimmer |
| 5,233,674 A | 8/1993 | Vladic |
| 5,239,609 A | 8/1993 | Auteri |
| 5,243,679 A | 9/1993 | Sharrow et al. |
| 5,253,320 A | 10/1993 | Takahashi et al. |
| 5,260,957 A | 11/1993 | Hakimi et al. |
| 5,261,633 A | 11/1993 | Mastro |
| 5,265,187 A | 11/1993 | Morin et al. |
| 5,274,729 A | 12/1993 | King et al. |
| 5,274,731 A | 12/1993 | White |
| 5,278,933 A | 1/1994 | Hunsinger et al. |
| 5,280,138 A | 1/1994 | Preston et al. |
| 5,285,515 A | 2/1994 | Milanowski et al. |
| 5,291,570 A | 3/1994 | Filgas et al. |
| 5,315,679 A | 5/1994 | Baldwin et al. |
| 5,317,663 A | 5/1994 | Beard et al. |
| 5,323,478 A | 6/1994 | Milanowski et al. |
| 5,323,480 A | 6/1994 | Mullaney et al. |
| 5,329,520 A | 7/1994 | Richardson |
| 5,333,193 A | 7/1994 | Cote et al. |
| 5,333,221 A | 7/1994 | Briggs et al. |
| 5,333,222 A | 7/1994 | Belenkiy et al. |
| 5,337,400 A | 8/1994 | Morin et al. |
| 5,339,379 A | 8/1994 | Kutsch et al. |
| 5,347,603 A | 9/1994 | Belenkiy et al. |
| 5,353,367 A | 10/1994 | Czosnowski et al. |
| 5,359,688 A | 10/1994 | Underwood |
| 5,363,466 A | 11/1994 | Milanowski et al. |
| 5,363,467 A | 11/1994 | Keith |
| 5,366,388 A | 11/1994 | Freeman et al. |
| 5,367,598 A | 11/1994 | Devenish, III et al. |
| 5,373,421 A | 12/1994 | Detsikas et al. |
| 5,383,051 A | 1/1995 | Delrosso et al. |
| 5,390,272 A | 2/1995 | Repta et al. |
| 5,398,295 A | 3/1995 | Chang et al. |
| 5,398,820 A | 3/1995 | Kiss |
| 5,399,814 A | 3/1995 | Staber et al. |
| 5,401,193 A | 3/1995 | Lo Cicero et al. |
| 5,402,515 A | 3/1995 | Vidacovich et al. |
| 5,408,557 A | 4/1995 | Hsu |
| RE34,955 E | 5/1995 | Anton et al. |
| 5,412,751 A | 5/1995 | Siemon et al. |
| 5,416,837 A | 5/1995 | Cote et al. |
| 5,418,874 A | 5/1995 | Carlisle et al. |
| 5,420,956 A | 5/1995 | Grugel et al. |
| 5,420,958 A | 5/1995 | Henson et al. |
| 5,421,532 A | 6/1995 | Richter |
| 5,438,641 A | 8/1995 | Malacarne |
| 5,442,725 A | 8/1995 | Peng |
| 5,442,726 A | 8/1995 | Howard et al. |
| 5,443,232 A | 8/1995 | Kesinger et al. |

(56) References Cited

U.S. PATENT DOCUMENTS

| | | |
|---|---|---|
| 5,444,804 A | 8/1995 | Yui et al. |
| 5,448,015 A | 9/1995 | Jamet et al. |
| 5,450,518 A | 9/1995 | Burek et al. |
| 5,458,019 A | 10/1995 | Trevino |
| 5,471,555 A | 11/1995 | Braga et al. |
| 5,479,505 A | 12/1995 | Butler et al. |
| 5,481,634 A | 1/1996 | Anderson et al. |
| 5,481,939 A | 1/1996 | Bernardini |
| 5,490,229 A | 2/1996 | Ghandeharizadeh et al. |
| 5,497,416 A | 3/1996 | Butler, III et al. |
| 5,497,444 A | 3/1996 | Wheeler |
| 5,511,144 A | 4/1996 | Hawkins et al. |
| 5,511,798 A | 4/1996 | Kawamoto et al. |
| 5,519,804 A | 5/1996 | Burek et al. |
| 5,530,786 A | 6/1996 | Radliff et al. |
| 5,535,970 A | 7/1996 | Gobbi |
| 5,538,213 A | 7/1996 | Brown |
| 5,542,015 A | 7/1996 | Hultermans |
| 5,546,495 A | 8/1996 | Bruckner et al. |
| 5,548,641 A | 8/1996 | Butler et al. |
| 5,553,183 A | 9/1996 | Bechamps |
| 5,553,186 A | 9/1996 | Allen |
| 5,563,971 A | 10/1996 | Abendschein |
| 5,572,617 A | 11/1996 | Bernhardt et al. |
| 5,575,680 A | 11/1996 | Suffi |
| 5,577,151 A | 11/1996 | Hoffer |
| 5,590,234 A | 12/1996 | Pulido |
| 5,595,507 A | 1/1997 | Braun et al. |
| 5,596,670 A | 1/1997 | Debortoli et al. |
| 5,600,020 A | 2/1997 | Wehle et al. |
| 5,602,954 A | 2/1997 | Nolf et al. |
| 5,608,606 A | 3/1997 | Blaney |
| 5,613,030 A | 3/1997 | Hoffer et al. |
| 5,617,501 A | 4/1997 | Miller et al. |
| 5,638,474 A | 6/1997 | Lampert et al. |
| 5,640,476 A | 6/1997 | Womack et al. |
| 5,640,482 A | 6/1997 | Barry et al. |
| 5,647,043 A | 7/1997 | Anderson et al. |
| 5,647,045 A | 7/1997 | Robinson et al. |
| 5,650,334 A | 7/1997 | Zuk et al. |
| 5,668,910 A | 9/1997 | Arnett |
| 5,668,911 A | 9/1997 | Debortoli |
| 5,671,273 A | 9/1997 | Lanquist |
| 5,689,605 A | 11/1997 | Cobb et al. |
| 5,689,607 A | 11/1997 | Vincent et al. |
| 5,692,079 A | 11/1997 | Iso |
| 5,694,511 A | 12/1997 | Pimpinella et al. |
| 5,701,380 A | 12/1997 | Larson et al. |
| 5,704,573 A | 1/1998 | de Beers et al. |
| 5,708,742 A | 1/1998 | Beun et al. |
| 5,708,751 A | 1/1998 | Mattei |
| 5,710,851 A | 1/1998 | Walter et al. |
| 5,717,810 A | 2/1998 | Wheeler |
| 5,734,776 A | 3/1998 | Puetz |
| 5,740,300 A | 4/1998 | Hodge |
| 5,742,982 A | 4/1998 | Dodd et al. |
| 5,751,874 A | 5/1998 | Chudoba et al. |
| 5,751,882 A | 5/1998 | Daems et al. |
| 5,754,724 A | 5/1998 | Peterson et al. |
| 5,758,003 A | 5/1998 | Wheeler et al. |
| 5,758,004 A | 5/1998 | Alarcon et al. |
| 5,761,026 A | 6/1998 | Robinson et al. |
| 5,765,698 A | 6/1998 | Bullivant |
| 5,769,908 A | 6/1998 | Koppelman |
| 5,774,612 A | 6/1998 | Belenkiy et al. |
| 5,778,122 A | 7/1998 | Giebel et al. |
| 5,778,130 A | 7/1998 | Walters et al. |
| 5,781,686 A | 7/1998 | Robinson et al. |
| 5,788,087 A | 8/1998 | Orlando |
| 5,790,741 A | 8/1998 | Vincent et al. |
| 5,793,920 A | 8/1998 | Wilkins et al. |
| 5,793,921 A | 8/1998 | Wilkins et al. |
| 5,796,908 A | 8/1998 | Vicory |
| 5,806,687 A | 9/1998 | Ballesteros et al. |
| 5,823,646 A | 10/1998 | Arizpe et al. |
| 5,825,955 A | 10/1998 | Ernst et al. |
| 5,825,961 A | 10/1998 | Wilkins et al. |
| 5,828,807 A | 10/1998 | Tucker et al. |
| 5,832,162 A | 11/1998 | Sarbell |
| 5,835,657 A | 11/1998 | Suarez et al. |
| 5,835,658 A | 11/1998 | Smith |
| 5,862,290 A | 1/1999 | Burek et al. |
| 5,870,519 A | 2/1999 | Jenkins et al. |
| 5,874,733 A | 2/1999 | Silver et al. |
| 5,877,565 A | 3/1999 | Hollenbach et al. |
| 5,880,864 A | 3/1999 | Williams et al. |
| 5,881,200 A | 3/1999 | Burt |
| 5,883,995 A | 3/1999 | Lu |
| 5,884,003 A | 3/1999 | Cloud et al. |
| 5,887,095 A | 3/1999 | Nagase et al. |
| 5,887,106 A | 3/1999 | Cheeseman et al. |
| 5,892,877 A | 4/1999 | Meyerhoefer |
| 5,894,540 A | 4/1999 | Drewing |
| 5,901,220 A | 5/1999 | Garver et al. |
| 5,903,693 A | 5/1999 | Brown |
| 5,906,342 A | 5/1999 | Kraus |
| 5,909,298 A | 6/1999 | Shimada et al. |
| 5,913,006 A | 6/1999 | Summach |
| 5,914,976 A | 6/1999 | Jayaraman et al. |
| 5,915,055 A | 6/1999 | Bennett et al. |
| 5,923,804 A | 7/1999 | Rosson |
| 5,930,425 A | 7/1999 | Abel et al. |
| 5,933,557 A | 8/1999 | Ott |
| 5,940,563 A | 8/1999 | Kobayashi et al. |
| 5,943,460 A | 8/1999 | Mead et al. |
| 5,945,633 A | 8/1999 | Ott et al. |
| 5,946,440 A | 8/1999 | Puetz |
| 5,949,946 A | 9/1999 | Debortoli et al. |
| 5,953,962 A | 9/1999 | Hewson |
| 5,956,439 A | 9/1999 | Pimpinella |
| 5,956,444 A | 9/1999 | Duda et al. |
| 5,956,449 A | 9/1999 | Otani et al. |
| 5,966,492 A | 10/1999 | Bechamps et al. |
| 5,969,294 A | 10/1999 | Eberle et al. |
| 5,975,769 A | 11/1999 | Larson et al. |
| 5,978,540 A | 11/1999 | Bechamps et al. |
| 5,980,303 A | 11/1999 | Lee et al. |
| 5,987,203 A | 11/1999 | Abel et al. |
| 5,993,071 A | 11/1999 | Hultermans |
| 5,995,700 A | 11/1999 | Burek et al. |
| 5,999,393 A | 12/1999 | Brower |
| 6,001,831 A | 12/1999 | Papenfuhs et al. |
| 6,009,224 A | 12/1999 | Allen |
| 6,009,225 A | 12/1999 | Ray et al. |
| 6,011,831 A | 1/2000 | Nieves et al. |
| 6,027,252 A | 2/2000 | Erdman et al. |
| 6,027,352 A | 2/2000 | Byrne |
| 6,041,042 A | 3/2000 | Bussiere |
| 6,044,193 A | 3/2000 | Szentesi et al. |
| 6,049,963 A | 4/2000 | Boe |
| 6,058,235 A | 5/2000 | Hiramatsu et al. |
| 6,061,492 A | 5/2000 | Strause et al. |
| 6,078,661 A | 6/2000 | Arnett et al. |
| 6,079,881 A | 6/2000 | Roth |
| 6,088,497 A | 7/2000 | Phillips et al. |
| 6,118,075 A | 9/2000 | Baker et al. |
| 6,127,627 A | 10/2000 | Daoud |
| 6,130,983 A | 10/2000 | Cheng |
| 6,134,370 A | 10/2000 | Childers et al. |
| 6,141,222 A | 10/2000 | Toor et al. |
| 6,149,313 A | 11/2000 | Giebel et al. |
| 6,149,315 A | 11/2000 | Stephenson |
| 6,151,432 A | 11/2000 | Nakajima et al. |
| 6,160,946 A | 12/2000 | Thompson et al. |
| 6,170,784 B1 * | 1/2001 | MacDonald et al. ........... 248/65 |
| 6,172,782 B1 | 1/2001 | Kobayashi |
| 6,175,079 B1 | 1/2001 | Johnston et al. |
| 6,181,861 B1 | 1/2001 | Wenski et al. |
| 6,188,687 B1 | 2/2001 | Mussman et al. |
| 6,188,825 B1 | 2/2001 | Bandy et al. |
| 6,192,180 B1 | 2/2001 | Kim et al. |
| 6,200,170 B1 | 3/2001 | Amberg et al. |
| 6,201,919 B1 | 3/2001 | Puetz et al. |
| 6,201,920 B1 | 3/2001 | Noble et al. |

(56) References Cited

U.S. PATENT DOCUMENTS

| | | |
|---|---|---|
| 6,208,796 B1 | 3/2001 | Williams Vigliaturo |
| 6,212,324 B1 | 4/2001 | Lin et al. |
| 6,215,938 B1 | 4/2001 | Reitmeier et al. |
| 6,216,987 B1 | 4/2001 | Fukuo |
| 6,227,717 B1 | 5/2001 | Ott et al. |
| 6,229,948 B1 | 5/2001 | Blee et al. |
| 6,234,683 B1 | 5/2001 | Waldron et al. |
| 6,234,685 B1 | 5/2001 | Carlisle et al. |
| 6,236,795 B1 | 5/2001 | Rodgers |
| 6,240,229 B1 | 5/2001 | Roth |
| 6,243,522 B1 | 6/2001 | Allan et al. |
| 6,245,998 B1 | 6/2001 | Curry et al. |
| 6,247,851 B1 | 6/2001 | Ichihara |
| 6,250,816 B1 | 6/2001 | Johnston et al. |
| 6,259,850 B1 | 7/2001 | Crosby, Jr. et al. |
| 6,263,141 B1 | 7/2001 | Smith |
| 6,265,680 B1 | 7/2001 | Robertson |
| 6,269,212 B1 | 7/2001 | Schiattone |
| 6,273,532 B1 | 8/2001 | Chen et al. |
| 6,275,641 B1 | 8/2001 | Daoud |
| 6,278,829 B1 | 8/2001 | BuAbbud et al. |
| 6,278,831 B1 | 8/2001 | Henderson et al. |
| D448,005 S | 9/2001 | Klein, Jr. et al. |
| 6,289,618 B1 | 9/2001 | Kump et al. |
| 6,292,614 B1 | 9/2001 | Smith et al. |
| 6,301,424 B1 | 10/2001 | Hwang |
| 6,305,848 B1 | 10/2001 | Gregory |
| 6,307,997 B1 | 10/2001 | Walters et al. |
| 6,318,824 B1 | 11/2001 | LaGrotta et al. |
| 6,321,017 B1 | 11/2001 | Janus et al. |
| 6,322,279 B1 | 11/2001 | Yamamoto et al. |
| 6,324,575 B1 | 11/2001 | Jain et al. |
| 6,325,549 B1 | 12/2001 | Shevchuk |
| 6,327,059 B1 | 12/2001 | Bhalla et al. |
| RE37,489 E | 1/2002 | Anton et al. |
| 6,343,313 B1 | 1/2002 | Salesky et al. |
| 6,344,615 B1 | 2/2002 | Nolf et al. |
| 6,347,888 B1 | 2/2002 | Puetz |
| 6,353,696 B1 | 3/2002 | Gordon et al. |
| 6,353,697 B1 | 3/2002 | Daoud |
| 6,357,712 B1 | 3/2002 | Lu |
| 6,359,228 B1 | 3/2002 | Strause et al. |
| 6,363,198 B1 | 3/2002 | Braga et al. |
| 6,363,200 B1 | 3/2002 | Thompson et al. |
| 6,370,309 B1 | 4/2002 | Daoud |
| 6,371,419 B1 | 4/2002 | Ohnuki |
| 6,375,129 B2 * | 4/2002 | Koziol .......................... 248/68.1 |
| 6,377,218 B1 | 4/2002 | Nelson et al. |
| 6,379,052 B1 | 4/2002 | De Jong et al. |
| 6,381,642 B1 | 4/2002 | O'Donnell et al. |
| 6,385,374 B2 | 5/2002 | Kropp |
| 6,385,381 B1 | 5/2002 | Janus et al. |
| 6,389,214 B1 | 5/2002 | Smith et al. |
| 6,397,166 B1 | 5/2002 | Leung et al. |
| 6,398,149 B1 | 6/2002 | Hines et al. |
| 6,406,314 B1 | 6/2002 | Byrne |
| 6,410,850 B1 | 6/2002 | Abel et al. |
| 6,411,767 B1 | 6/2002 | Burrous et al. |
| 6,412,986 B1 | 7/2002 | Ngo et al. |
| 6,418,262 B1 | 7/2002 | Puetz et al. |
| 6,419,519 B1 | 7/2002 | Young |
| 6,424,781 B1 | 7/2002 | Puetz et al. |
| 6,425,694 B1 | 7/2002 | Szilagyi et al. |
| 6,427,045 B1 | 7/2002 | Matthes et al. |
| 6,431,762 B1 | 8/2002 | Taira et al. |
| 6,434,313 B1 | 8/2002 | Clapp, Jr. et al. |
| 6,438,310 B1 | 8/2002 | Lance et al. |
| 6,452,925 B1 | 9/2002 | Sistanizadeh et al. |
| 6,456,773 B1 | 9/2002 | Keys |
| 6,464,402 B1 | 10/2002 | Andrews et al. |
| 6,466,724 B1 | 10/2002 | Glover et al. |
| 6,469,905 B1 | 10/2002 | Hwang |
| D466,087 S | 11/2002 | Cuny et al. |
| 6,478,472 B1 | 11/2002 | Anderson et al. |
| 6,480,487 B1 | 11/2002 | Wegleitner et al. |
| 6,480,660 B1 | 11/2002 | Reitmeier et al. |
| 6,483,977 B2 | 11/2002 | Battey et al. |
| 6,484,958 B1 | 11/2002 | Xue et al. |
| 6,494,550 B1 | 12/2002 | Chen et al. |
| 6,496,640 B1 | 12/2002 | Harvey et al. |
| 6,504,988 B1 | 1/2003 | Trebesch et al. |
| 6,507,980 B2 | 1/2003 | Bremicker |
| 6,510,274 B1 | 1/2003 | Wu et al. |
| 6,532,332 B2 | 3/2003 | Solheid et al. |
| 6,533,472 B1 | 3/2003 | Dinh et al. |
| 6,535,397 B2 | 3/2003 | Clark et al. |
| 6,535,682 B1 | 3/2003 | Puetz et al. |
| 6,539,147 B1 | 3/2003 | Mahony |
| 6,539,160 B2 | 3/2003 | Battey et al. |
| 6,542,688 B1 | 4/2003 | Battey et al. |
| 6,544,075 B1 | 4/2003 | Liao |
| 6,550,977 B2 | 4/2003 | Hizuka |
| 6,554,485 B1 | 4/2003 | Beatty et al. |
| 6,560,334 B1 | 5/2003 | Mullaney et al. |
| 6,567,601 B2 | 5/2003 | Daoud et al. |
| 6,568,542 B1 | 5/2003 | Chen |
| 6,571,048 B1 | 5/2003 | Bechamps et al. |
| 6,577,595 B1 | 6/2003 | Counterman |
| 6,577,801 B2 | 6/2003 | Broderick et al. |
| 6,579,014 B2 | 6/2003 | Melton et al. |
| 6,584,267 B1 | 6/2003 | Caveney et al. |
| 6,585,423 B1 | 7/2003 | Vergeest |
| 6,587,630 B2 | 7/2003 | Spence et al. |
| 6,588,938 B1 | 7/2003 | Lampert et al. |
| 6,591,051 B2 | 7/2003 | Solheid et al. |
| 6,591,053 B2 | 7/2003 | Fritz |
| 6,592,266 B1 | 7/2003 | Hankins et al. |
| 6,597,670 B1 | 7/2003 | Tweedy et al. |
| 6,600,106 B2 | 7/2003 | Standish et al. |
| 6,600,866 B2 | 7/2003 | Gatica et al. |
| 6,601,997 B2 | 8/2003 | Ngo |
| 6,612,515 B1 | 9/2003 | Tinucci et al. |
| 6,612,874 B1 | 9/2003 | Stout et al. |
| 6,614,978 B1 | 9/2003 | Caveney |
| 6,614,980 B1 | 9/2003 | Mahony |
| 6,621,975 B2 | 9/2003 | Laporte et al. |
| 6,622,873 B2 | 9/2003 | Hegrenes et al. |
| 6,624,389 B1 | 9/2003 | Cox |
| 6,625,374 B2 | 9/2003 | Holman et al. |
| 6,625,375 B1 | 9/2003 | Mahony |
| 6,631,237 B2 | 10/2003 | Knudsen et al. |
| 6,640,042 B2 | 10/2003 | Araki et al. |
| RE38,311 E | 11/2003 | Wheeler |
| 6,644,863 B1 | 11/2003 | Azami et al. |
| 6,647,197 B1 | 11/2003 | Marrs et al. |
| 6,648,520 B2 | 11/2003 | McDonald et al. |
| 6,654,536 B2 | 11/2003 | Battey et al. |
| 6,668,127 B1 | 12/2003 | Mahony |
| 6,669,149 B2 | 12/2003 | Akizuki |
| 6,677,520 B1 | 1/2004 | Kim et al. |
| 6,679,604 B1 | 1/2004 | Bove et al. |
| 6,684,005 B1 | 1/2004 | Egnell et al. |
| 6,687,450 B1 | 2/2004 | Kempeneers et al. |
| 6,693,552 B1 | 2/2004 | Herzig et al. |
| 6,695,620 B1 | 2/2004 | Huang |
| 6,701,056 B2 | 3/2004 | Burek et al. |
| 6,710,366 B1 | 3/2004 | Lee et al. |
| 6,715,619 B2 | 4/2004 | Kim et al. |
| 6,719,149 B2 | 4/2004 | Tomino |
| 6,721,482 B1 | 4/2004 | Glynn |
| 6,741,784 B1 | 5/2004 | Guan |
| 6,741,785 B2 | 5/2004 | Barthel et al. |
| 6,746,037 B1 | 6/2004 | Kaplenski et al. |
| 6,748,154 B2 | 6/2004 | O'Leary et al. |
| 6,748,155 B2 | 6/2004 | Kim et al. |
| 6,758,600 B2 | 7/2004 | Del Grosso et al. |
| 6,768,860 B2 | 7/2004 | Liberty |
| 6,771,861 B2 | 8/2004 | Wagner et al. |
| 6,773,297 B2 | 8/2004 | Komiya |
| 6,778,525 B1 | 8/2004 | Baum et al. |
| 6,778,752 B2 | 8/2004 | Laporte et al. |
| 6,786,647 B1 | 9/2004 | Hinds et al. |
| 6,786,743 B2 | 9/2004 | Huang |
| 6,786,896 B1 | 9/2004 | Madhani et al. |

(56) References Cited

U.S. PATENT DOCUMENTS

| | | | |
|---|---|---|---|
| 6,788,871 B2 | 9/2004 | Taylor |
| 6,792,190 B2 | 9/2004 | Xin et al. |
| 6,798,751 B1 | 9/2004 | Voit et al. |
| 6,804,447 B2 | 10/2004 | Smith et al. |
| 6,810,194 B2 | 10/2004 | Griffiths et al. |
| 6,813,412 B2 | 11/2004 | Lin |
| 6,816,660 B2 | 11/2004 | Nashimoto |
| 6,818,834 B1 * | 11/2004 | Lin .............................. 174/135 |
| 6,819,856 B2 | 11/2004 | Dagley et al. |
| 6,819,857 B2 | 11/2004 | Douglas et al. |
| 6,822,874 B1 | 11/2004 | Marler |
| 6,826,174 B1 | 11/2004 | Erekson et al. |
| 6,826,346 B2 | 11/2004 | Sloan et al. |
| 6,826,631 B2 | 11/2004 | Webb |
| 6,830,489 B2 | 12/2004 | Aoyama |
| 6,839,428 B2 | 1/2005 | Brower et al. |
| 6,839,438 B1 | 1/2005 | Riegelsberger et al. |
| 6,840,815 B2 | 1/2005 | Musolf et al. |
| 6,845,207 B2 | 1/2005 | Schray |
| 6,847,614 B2 | 1/2005 | Banker et al. |
| 6,848,862 B1 | 2/2005 | Schlig |
| 6,850,685 B2 | 2/2005 | Tinucci et al. |
| 6,853,637 B1 | 2/2005 | Norrell et al. |
| 6,854,894 B1 | 2/2005 | Yunker et al. |
| 6,856,334 B1 | 2/2005 | Fukui |
| 6,856,505 B1 | 2/2005 | Venegas et al. |
| 6,863,444 B2 | 3/2005 | Anderson et al. |
| 6,865,331 B2 | 3/2005 | Mertesdorf |
| 6,865,334 B2 | 3/2005 | Cooke et al. |
| 6,866,541 B2 | 3/2005 | Barker et al. |
| 6,868,216 B1 | 3/2005 | Gehrke |
| 6,869,227 B2 | 3/2005 | Del Grosso et al. |
| 6,870,734 B2 | 3/2005 | Mertesdorf et al. |
| 6,870,997 B2 | 3/2005 | Cooke |
| 6,879,545 B2 | 4/2005 | Cooke et al. |
| 6,915,058 B2 | 7/2005 | Pons |
| 6,920,273 B2 | 7/2005 | Knudsen |
| 6,920,274 B2 | 7/2005 | Rapp et al. |
| 6,923,406 B2 | 8/2005 | Akizuki |
| 6,925,241 B2 | 8/2005 | Bohle et al. |
| 6,934,451 B2 | 8/2005 | Cooke |
| 6,934,456 B2 | 8/2005 | Ferris et al. |
| 6,935,598 B2 | 8/2005 | Sono et al. |
| 6,937,807 B2 | 8/2005 | Franklin et al. |
| 6,944,383 B1 | 9/2005 | Herzog et al. |
| 6,944,389 B2 | 9/2005 | Giraud et al. |
| 6,945,701 B2 | 9/2005 | Trezza et al. |
| 6,952,530 B2 | 10/2005 | Helvajian et al. |
| 6,963,690 B1 | 11/2005 | Kassal et al. |
| 6,968,107 B2 | 11/2005 | Belardi et al. |
| 6,968,111 B2 | 11/2005 | Trebesch et al. |
| 6,985,665 B2 | 1/2006 | Baechtle |
| 6,993,237 B2 | 1/2006 | Cooke et al. |
| 7,000,784 B2 | 2/2006 | Canty et al. |
| 7,005,582 B2 | 2/2006 | Muller et al. |
| 7,006,748 B2 | 2/2006 | Dagley et al. |
| 7,007,296 B2 | 2/2006 | Rakib |
| 7,025,275 B2 | 4/2006 | Huang et al. |
| 7,027,695 B2 | 4/2006 | Cooke et al. |
| 7,027,706 B2 | 4/2006 | Diaz et al. |
| 7,031,588 B2 | 4/2006 | Cowley et al. |
| 7,035,510 B2 | 4/2006 | Zimmel et al. |
| 7,038,137 B2 | 5/2006 | Grubish et al. |
| 7,048,447 B1 | 5/2006 | Patel et al. |
| 7,054,513 B2 | 5/2006 | Herz et al. |
| 7,066,748 B2 | 6/2006 | Bricaud et al. |
| 7,068,907 B2 | 6/2006 | Schray |
| 7,070,459 B2 | 7/2006 | Denovich et al. |
| 7,077,710 B2 | 7/2006 | Haggay et al. |
| 7,079,744 B2 | 7/2006 | Douglas et al. |
| 7,090,406 B2 | 8/2006 | Melton et al. |
| 7,090,407 B2 | 8/2006 | Melton et al. |
| 7,094,095 B1 | 8/2006 | Caveney |
| 7,097,047 B2 | 8/2006 | Lee et al. |
| 7,101,093 B2 | 9/2006 | Hsiao et al. |
| 7,102,884 B2 | 9/2006 | Mertesdorf et al. |
| 7,103,255 B2 | 9/2006 | Reagan et al. |
| 7,110,654 B2 | 9/2006 | Dillat |
| 7,111,990 B2 | 9/2006 | Melton et al. |
| 7,113,679 B2 | 9/2006 | Melton et al. |
| 7,113,686 B2 | 9/2006 | Bellekens et al. |
| 7,113,687 B2 | 9/2006 | Womack et al. |
| 7,116,491 B1 | 10/2006 | Willey et al. |
| 7,116,883 B2 | 10/2006 | Kline et al. |
| 7,118,281 B2 | 10/2006 | Chiu et al. |
| 7,118,405 B2 | 10/2006 | Peng |
| 7,120,347 B2 | 10/2006 | Blackwell, Jr. et al. |
| 7,120,348 B2 | 10/2006 | Trebesch et al. |
| 7,120,349 B2 | 10/2006 | Elliott |
| 7,127,143 B2 | 10/2006 | Elkins, II et al. |
| 7,128,471 B2 | 10/2006 | Wilson |
| 7,136,555 B2 | 11/2006 | Theuerkorn et al. |
| 7,139,462 B1 | 11/2006 | Richtman |
| 7,140,903 B2 * | 11/2006 | Pulizzi et al. .................. 439/371 |
| 7,147,383 B2 | 12/2006 | Sullivan |
| 7,170,466 B2 | 1/2007 | Janoschka |
| 7,171,099 B2 | 1/2007 | Barnes et al. |
| 7,171,121 B1 | 1/2007 | Skarica et al. |
| 7,181,142 B1 | 2/2007 | Xu et al. |
| 7,186,134 B2 | 3/2007 | Togami et al. |
| 7,193,783 B2 | 3/2007 | Willey et al. |
| 7,194,181 B2 | 3/2007 | Holmberg et al. |
| 7,195,521 B2 | 3/2007 | Musolf et al. |
| 7,200,314 B2 | 4/2007 | Womack et al. |
| 7,200,316 B2 | 4/2007 | Giraud et al. |
| 7,201,595 B1 | 4/2007 | Morello |
| 7,217,040 B2 | 5/2007 | Crews et al. |
| 7,218,526 B2 | 5/2007 | Mayer |
| 7,220,065 B2 | 5/2007 | Han et al. |
| 7,221,832 B2 * | 5/2007 | Tinucci ........................ 385/106 |
| 7,228,036 B2 | 6/2007 | Elkins, II et al. |
| 7,228,047 B1 | 6/2007 | Szilagyi et al. |
| 7,231,125 B2 | 6/2007 | Douglas et al. |
| 7,234,878 B2 | 6/2007 | Yamauchi et al. |
| 7,236,677 B2 | 6/2007 | Escoto et al. |
| 7,239,789 B2 | 7/2007 | Grubish et al. |
| 7,245,809 B1 | 7/2007 | Gniadek et al. |
| 7,259,325 B2 | 8/2007 | Pincu et al. |
| 7,266,283 B2 | 9/2007 | Kline et al. |
| 7,270,485 B1 | 9/2007 | Robinson et al. |
| 7,272,291 B2 | 9/2007 | Bayazit et al. |
| 7,274,852 B1 | 9/2007 | Smrha et al. |
| 7,284,785 B2 | 10/2007 | Gotou et al. |
| 7,287,913 B2 | 10/2007 | Keenum et al. |
| 7,289,731 B2 | 10/2007 | Thinguldstad |
| 7,292,769 B2 | 11/2007 | Watanabe et al. |
| 7,298,950 B2 | 11/2007 | Frohlich |
| 7,300,216 B2 | 11/2007 | Morse et al. |
| 7,300,308 B2 | 11/2007 | Laursen et al. |
| 7,302,149 B2 | 11/2007 | Swam et al. |
| 7,302,153 B2 | 11/2007 | Thom |
| 7,302,154 B2 | 11/2007 | Trebesch et al. |
| 7,308,184 B2 | 12/2007 | Barnes et al. |
| 7,310,471 B2 | 12/2007 | Bayazit et al. |
| 7,310,472 B2 | 12/2007 | Haberman |
| 7,315,681 B2 | 1/2008 | Kewitsch |
| 7,325,975 B2 | 2/2008 | Yamada et al. |
| 7,330,624 B2 | 2/2008 | Isenhour et al. |
| 7,330,625 B2 | 2/2008 | Barth |
| 7,330,626 B2 | 2/2008 | Kowalczyk et al. |
| 7,330,629 B2 | 2/2008 | Cooke et al. |
| 7,331,718 B2 | 2/2008 | Yazaki et al. |
| 7,340,145 B2 | 3/2008 | Allen |
| 7,349,615 B2 | 3/2008 | Frazier et al. |
| 7,352,946 B2 | 4/2008 | Heller et al. |
| 7,352,947 B2 | 4/2008 | Phung et al. |
| 7,373,071 B2 | 5/2008 | Douglas et al. |
| 7,376,321 B2 | 5/2008 | Bolster et al. |
| 7,376,323 B2 | 5/2008 | Zimmel |
| 7,391,952 B1 | 6/2008 | Ugolini et al. |
| 7,397,996 B2 | 7/2008 | Herzog et al. |
| 7,400,813 B2 | 7/2008 | Zimmel |
| 7,404,736 B2 * | 7/2008 | Herbst et al. .................. 439/557 |
| 7,409,137 B2 | 8/2008 | Barnes |

(56) References Cited

U.S. PATENT DOCUMENTS

| | | |
|---|---|---|
| 7,414,198 B2 | 8/2008 | Stansbie et al. |
| 7,417,188 B2 | 8/2008 | McNutt et al. |
| 7,418,182 B2 | 8/2008 | Krampotich |
| 7,418,184 B1 | 8/2008 | Gonzales et al. |
| 7,421,182 B2 | 9/2008 | Bayazit et al. |
| 7,428,363 B2 | 9/2008 | Leon et al. |
| 7,435,090 B1 | 10/2008 | Schriefer et al. |
| 7,437,049 B2 | 10/2008 | Krampotich |
| 7,439,453 B2 | 10/2008 | Murano et al. |
| 7,454,113 B2 | 11/2008 | Barnes |
| 7,460,757 B2 | 12/2008 | Hoehne et al. |
| 7,460,758 B2 | 12/2008 | Xin |
| 7,461,981 B2 | 12/2008 | Yow, Jr. et al. |
| 7,462,779 B2 | 12/2008 | Caveney et al. |
| 7,463,810 B2 | 12/2008 | Bayazit et al. |
| 7,463,811 B2 | 12/2008 | Trebesch et al. |
| 7,469,090 B2 | 12/2008 | Ferris et al. |
| 7,471,867 B2 | 12/2008 | Vogel et al. |
| 7,474,828 B2 | 1/2009 | Leon et al. |
| 7,477,824 B2 | 1/2009 | Reagan et al. |
| 7,477,826 B2 | 1/2009 | Mullaney et al. |
| 7,480,438 B2 | 1/2009 | Douglas et al. |
| 7,488,205 B2 | 2/2009 | Spisany et al. |
| 7,493,002 B2 | 2/2009 | Coburn et al. |
| 7,496,269 B1 | 2/2009 | Lee |
| 7,499,622 B2 | 3/2009 | Castonguay et al. |
| 7,499,623 B2 | 3/2009 | Barnes et al. |
| 7,507,111 B2 | 3/2009 | Togami et al. |
| 7,509,015 B2 | 3/2009 | Murano |
| 7,509,016 B2 | 3/2009 | Smith et al. |
| 7,510,421 B2 | 3/2009 | Fransen et al. |
| 7,522,804 B2 | 4/2009 | Araki et al. |
| 7,523,898 B1 | 4/2009 | Barry et al. |
| 7,526,171 B2 | 4/2009 | Caveney et al. |
| 7,526,172 B2 | 4/2009 | Gniadek et al. |
| 7,526,174 B2 | 4/2009 | Leon et al. |
| 7,529,458 B2 | 5/2009 | Spisany et al. |
| 7,534,958 B2 | 5/2009 | McNutt et al. |
| 7,536,075 B2 | 5/2009 | Zimmel |
| 7,540,666 B2 | 6/2009 | Luther et al. |
| 7,542,645 B1 | 6/2009 | Hua et al. |
| 7,544,085 B2 | 6/2009 | Baldwin et al. |
| 7,552,899 B2 | 6/2009 | Chen et al. |
| 7,555,193 B2 | 6/2009 | Rapp et al. |
| 7,558,458 B2 | 7/2009 | Gronvall et al. |
| 7,565,051 B2 | 7/2009 | Vongseng |
| 7,567,744 B2 | 7/2009 | Krampotich et al. |
| 7,570,860 B2 | 8/2009 | Smrha et al. |
| 7,570,861 B2 | 8/2009 | Smrha et al. |
| 7,577,331 B2 | 8/2009 | Laurisch et al. |
| 7,596,293 B2 | 9/2009 | Isenhour et al. |
| 7,603,020 B1 | 10/2009 | Wakileh et al. |
| 7,607,938 B2 | 10/2009 | Clark et al. |
| 7,609,967 B2 | 10/2009 | Hochbaum et al. |
| 7,613,377 B2 | 11/2009 | Gonzales et al. |
| 7,614,903 B1 | 11/2009 | Huang |
| 7,620,272 B2 | 11/2009 | Hino et al. |
| 7,620,287 B2 | 11/2009 | Appenzeller et al. |
| 7,641,398 B2 | 1/2010 | O'Riorden et al. |
| 7,668,430 B2 | 2/2010 | McClellan et al. |
| 7,668,433 B2 | 2/2010 | Bayazit et al. |
| 7,672,561 B1 | 3/2010 | Keith et al. |
| 7,676,135 B2 | 3/2010 | Chen |
| 7,689,079 B2 | 3/2010 | Burnham et al. |
| 7,694,926 B2 | 4/2010 | Allen et al. |
| 7,697,811 B2 | 4/2010 | Murano et al. |
| 7,706,294 B2 | 4/2010 | Natarajan et al. |
| 7,715,125 B2 | 5/2010 | Willey |
| 7,715,683 B2 | 5/2010 | Kowalczyk et al. |
| 7,734,138 B2 | 6/2010 | Bloodworth et al. |
| 7,740,409 B2 | 6/2010 | Bolton et al. |
| 7,743,495 B2 | 6/2010 | Mori et al. |
| 7,751,674 B2 | 7/2010 | Hill |
| 7,751,675 B2 | 7/2010 | Holmberg et al. |
| 7,756,371 B1 | 7/2010 | Burnham et al. |
| 7,756,382 B2 | 7/2010 | Saravanos et al. |
| 7,760,984 B2 | 7/2010 | Solheid et al. |
| 7,764,858 B2 | 7/2010 | Bayazit et al. |
| 7,764,859 B2 | 7/2010 | Krampotich et al. |
| 7,769,266 B2 | 8/2010 | Morris |
| 7,805,044 B2 | 9/2010 | Reagan et al. |
| 7,809,232 B2 | 10/2010 | Reagan et al. |
| 7,809,235 B2 | 10/2010 | Reagan et al. |
| 7,811,136 B1 | 10/2010 | Hsieh et al. |
| 7,822,310 B2 | 10/2010 | Castonguay et al. |
| 7,837,495 B2 | 11/2010 | Baldwin et al. |
| 7,850,372 B2 | 12/2010 | Nishimura et al. |
| 7,853,112 B2 | 12/2010 | Zimmel et al. |
| 7,856,166 B2 | 12/2010 | Biribuze et al. |
| 7,862,369 B2 | 1/2011 | Gimenes et al. |
| 7,869,685 B2 | 1/2011 | Hendrickson et al. |
| 7,876,580 B2 | 1/2011 | Mayer |
| 7,899,298 B2 | 3/2011 | Cox et al. |
| 7,914,332 B2 | 3/2011 | Song et al. |
| 7,942,589 B2 | 5/2011 | Yazaki et al. |
| 7,945,135 B2 | 5/2011 | Cooke et al. |
| 7,945,136 B2 | 5/2011 | Cooke et al. |
| 7,945,138 B2 | 5/2011 | Hill et al. |
| 7,970,250 B2 | 6/2011 | Morris |
| 7,991,252 B2 | 8/2011 | Cheng et al. |
| 8,009,959 B2 | 8/2011 | Barnes et al. |
| 8,014,171 B2 | 9/2011 | Kelly et al. |
| 8,014,646 B2 | 9/2011 | Keith et al. |
| 8,020,813 B1 | 9/2011 | Clark et al. |
| 8,059,932 B2 | 11/2011 | Hill et al. |
| 8,093,499 B2 | 1/2012 | Hoffer et al. |
| 8,107,785 B2 | 1/2012 | Berglund et al. |
| 8,131,126 B2 | 3/2012 | Kowalczyk et al. |
| 8,184,938 B2 | 5/2012 | Cooke et al. |
| 8,206,043 B2 | 6/2012 | Thirugnanam et al. |
| 8,206,058 B2 | 6/2012 | Vrondran et al. |
| 8,220,881 B2 | 7/2012 | Keith |
| 8,226,305 B2 | 7/2012 | Thirugnanam et al. |
| 8,249,410 B2 | 8/2012 | Andrus et al. |
| 8,251,591 B2 | 8/2012 | Barnes et al. |
| 8,270,798 B2 | 9/2012 | Dagley et al. |
| 8,280,216 B2 | 10/2012 | Cooke et al. |
| 8,285,104 B2 | 10/2012 | Davis et al. |
| 8,301,004 B2 | 10/2012 | Cooke et al. |
| 8,331,752 B2 | 12/2012 | Biribuze et al. |
| 8,353,494 B2 | 1/2013 | Peng et al. |
| 8,369,679 B2 | 2/2013 | Wakileh et al. |
| 8,391,666 B2 | 3/2013 | Hetzer et al. |
| 8,472,773 B2 | 6/2013 | de Jong |
| 8,491,331 B2 | 7/2013 | Follingstad |
| 8,528,872 B2 | 9/2013 | Mattlin et al. |
| 8,537,477 B2 | 9/2013 | Shioda |
| 8,538,226 B2 | 9/2013 | Makrides-Saravanos et al. |
| 8,559,783 B2 | 10/2013 | Campos et al. |
| 2001/0010741 A1 | 8/2001 | Hizuka |
| 2001/0029125 A1 | 10/2001 | Morita et al. |
| 2002/0010818 A1 | 1/2002 | Wei et al. |
| 2002/0012353 A1 | 1/2002 | Gerszberg et al. |
| 2002/0014571 A1 | 2/2002 | Thompson |
| 2002/0034290 A1 | 3/2002 | Pershan |
| 2002/0037139 A1 | 3/2002 | Asao et al. |
| 2002/0064364 A1 | 5/2002 | Battey et al. |
| 2002/0131730 A1 | 9/2002 | Keeble et al. |
| 2002/0136519 A1 | 9/2002 | Tinucci et al. |
| 2002/0141724 A1 | 10/2002 | Ogawa et al. |
| 2002/0150372 A1 | 10/2002 | Schray |
| 2002/0172467 A1 | 11/2002 | Anderson et al. |
| 2002/0180163 A1 | 12/2002 | Muller et al. |
| 2002/0181918 A1 | 12/2002 | Spence et al. |
| 2002/0181922 A1 | 12/2002 | Xin et al. |
| 2002/0191939 A1 | 12/2002 | Daoud et al. |
| 2002/0194596 A1 | 12/2002 | Srivastava |
| 2003/0002802 A1 | 1/2003 | Trezza et al. |
| 2003/0007743 A1 | 1/2003 | Asada |
| 2003/0007767 A1 | 1/2003 | Douglas et al. |
| 2003/0011855 A1 | 1/2003 | Fujiwara |
| 2003/0021539 A1 | 1/2003 | Kwon et al. |
| 2003/0036748 A1 | 2/2003 | Cooper et al. |
| 2003/0051026 A1 | 3/2003 | Carter et al. |

(56) References Cited

U.S. PATENT DOCUMENTS

| | | |
|---|---|---|
| 2003/0066998 A1 | 4/2003 | Lee |
| 2003/0086675 A1 | 5/2003 | Wu et al. |
| 2003/0095753 A1 | 5/2003 | Wada et al. |
| 2003/0147604 A1 | 8/2003 | Tapia et al. |
| 2003/0156552 A1 | 8/2003 | Banker et al. |
| 2003/0174996 A1 | 9/2003 | Henschel et al. |
| 2003/0180004 A1 | 9/2003 | Cox et al. |
| 2003/0180012 A1 | 9/2003 | Deane et al. |
| 2003/0183413 A1 | 10/2003 | Kato |
| 2003/0199201 A1 | 10/2003 | Mullaney et al. |
| 2003/0210882 A1 | 11/2003 | Barthel et al. |
| 2003/0223723 A1 | 12/2003 | Massey et al. |
| 2003/0223725 A1 | 12/2003 | Laporte et al. |
| 2003/0235387 A1 | 12/2003 | Dufour |
| 2004/0001717 A1 | 1/2004 | Bennett et al. |
| 2004/0013389 A1 | 1/2004 | Taylor |
| 2004/0013390 A1 | 1/2004 | Kim et al. |
| 2004/0022494 A1 | 2/2004 | Liddle et al. |
| 2004/0024934 A1 | 2/2004 | Webb |
| 2004/0067036 A1 | 4/2004 | Clark et al. |
| 2004/0074852 A1 | 4/2004 | Knudsen et al. |
| 2004/0086238 A1 | 5/2004 | Finona et al. |
| 2004/0086252 A1 | 5/2004 | Smith et al. |
| 2004/0120679 A1 | 6/2004 | Vincent et al. |
| 2004/0147159 A1 | 7/2004 | Urban et al. |
| 2004/0151465 A1 | 8/2004 | Krampotich et al. |
| 2004/0175090 A1 | 9/2004 | Vastmans et al. |
| 2004/0192115 A1 | 9/2004 | Bugg |
| 2004/0196841 A1 | 10/2004 | Tudor et al. |
| 2004/0208459 A1 | 10/2004 | Mizue et al. |
| 2004/0228598 A1 | 11/2004 | Allen et al. |
| 2004/0240827 A1 | 12/2004 | Daoud et al. |
| 2004/0240882 A1 | 12/2004 | Lipski et al. |
| 2004/0264873 A1 | 12/2004 | Smith et al. |
| 2005/0002633 A1 | 1/2005 | Solheid et al. |
| 2005/0008131 A1 | 1/2005 | Cook |
| 2005/0026497 A1 | 2/2005 | Holliday |
| 2005/0036749 A1 | 2/2005 | Vogel et al. |
| 2005/0067358 A1 | 3/2005 | Lee et al. |
| 2005/0069248 A1 | 3/2005 | Jasti et al. |
| 2005/0074990 A1 | 4/2005 | Shearman et al. |
| 2005/0076149 A1 | 4/2005 | McKown et al. |
| 2005/0083959 A1 | 4/2005 | Binder |
| 2005/0107086 A1 | 5/2005 | Tell et al. |
| 2005/0111809 A1 | 5/2005 | Giraud et al. |
| 2005/0111810 A1 | 5/2005 | Giraud et al. |
| 2005/0123261 A1 | 6/2005 | Bellekens et al. |
| 2005/0129379 A1 | 6/2005 | Reagan et al. |
| 2005/0175293 A1 | 8/2005 | Byers et al. |
| 2005/0178573 A1 | 8/2005 | James |
| 2005/0201073 A1 | 9/2005 | Pincu et al. |
| 2005/0232566 A1 | 10/2005 | Rapp et al. |
| 2005/0233647 A1 | 10/2005 | Denovich et al. |
| 2005/0254757 A1 | 11/2005 | Ferretti, III et al. |
| 2005/0281526 A1 | 12/2005 | Vongseng et al. |
| 2005/0281527 A1 | 12/2005 | Wilson et al. |
| 2005/0285493 A1 | 12/2005 | Hu et al. |
| 2006/0007562 A1 | 1/2006 | Willey et al. |
| 2006/0018448 A1 | 1/2006 | Stevens et al. |
| 2006/0018622 A1 | 1/2006 | Caveney |
| 2006/0034048 A1 | 2/2006 | Xu |
| 2006/0039290 A1 | 2/2006 | Roden et al. |
| 2006/0044774 A1 | 3/2006 | Vasavda et al. |
| 2006/0045458 A1 | 3/2006 | Sasaki et al. |
| 2006/0072606 A1 | 4/2006 | Posthuma |
| 2006/0077968 A1 | 4/2006 | Pitsoulakis et al. |
| 2006/0093303 A1 | 5/2006 | Reagan et al. |
| 2006/0103270 A1 | 5/2006 | Bergesch et al. |
| 2006/0110118 A1 | 5/2006 | Escoto et al. |
| 2006/0127026 A1 | 6/2006 | Beck |
| 2006/0133736 A1 | 6/2006 | Sullivan |
| 2006/0133759 A1 | 6/2006 | Mullaney et al. |
| 2006/0147172 A1 | 7/2006 | Luther et al. |
| 2006/0153517 A1 | 7/2006 | Reagan et al. |
| 2006/0160377 A1 | 7/2006 | Huang |
| 2006/0165365 A1 | 7/2006 | Feustel et al. |
| 2006/0165366 A1 | 7/2006 | Feustel et al. |
| 2006/0191700 A1 | 8/2006 | Herzog et al. |
| 2006/0193590 A1 | 8/2006 | Puetz et al. |
| 2006/0193591 A1 | 8/2006 | Rapp et al. |
| 2006/0198098 A1 | 9/2006 | Clark et al. |
| 2006/0204179 A1 | 9/2006 | Patel et al. |
| 2006/0215980 A1 | 9/2006 | Bayazit et al. |
| 2006/0225912 A1 | 10/2006 | Clark et al. |
| 2006/0228087 A1 | 10/2006 | Bayazit et al. |
| 2006/0269194 A1 | 11/2006 | Luther et al. |
| 2006/0269206 A1 | 11/2006 | Zimmel |
| 2006/0269208 A1 | 11/2006 | Allen et al. |
| 2006/0275008 A1 | 12/2006 | Xin |
| 2006/0275009 A1 | 12/2006 | Ellison et al. |
| 2006/0285812 A1 | 12/2006 | Ferris et al. |
| 2007/0003204 A1 | 1/2007 | Makrides-Saravanos et al. |
| 2007/0025070 A1 | 2/2007 | Jiang et al. |
| 2007/0031099 A1 | 2/2007 | Herzog et al. |
| 2007/0033629 A1 | 2/2007 | McGranahan et al. |
| 2007/0047894 A1 | 3/2007 | Holmberg et al. |
| 2007/0058641 A1 | 3/2007 | Cicchetti et al. |
| 2007/0086723 A1 | 4/2007 | Sasaki et al. |
| 2007/0104447 A1 | 5/2007 | Allen |
| 2007/0110373 A1 | 5/2007 | Dudek et al. |
| 2007/0127201 A1 | 6/2007 | Mertesdorf et al. |
| 2007/0131628 A1 | 6/2007 | Mimlitch, III et al. |
| 2007/0183732 A1 | 8/2007 | Wittmeier et al. |
| 2007/0189692 A1 | 8/2007 | Zimmel et al. |
| 2007/0196071 A1 | 8/2007 | Laursen et al. |
| 2007/0221793 A1 | 9/2007 | Kusuda et al. |
| 2007/0237484 A1 | 10/2007 | Reagan et al. |
| 2007/0257159 A1 | 11/2007 | Nelson et al. |
| 2007/0266192 A1 | 11/2007 | Campini et al. |
| 2007/0274718 A1 | 11/2007 | Bridges et al. |
| 2008/0011514 A1 | 1/2008 | Zheng et al. |
| 2008/0025683 A1 | 1/2008 | Murano |
| 2008/0031585 A1 | 2/2008 | Solheid et al. |
| 2008/0063350 A1 | 3/2008 | Trebesch et al. |
| 2008/0068788 A1 | 3/2008 | Ozawa et al. |
| 2008/0069511 A1 | 3/2008 | Blackwell, Jr. et al. |
| 2008/0069512 A1 | 3/2008 | Barnes et al. |
| 2008/0078899 A1 | 4/2008 | Chen et al. |
| 2008/0080826 A1 | 4/2008 | Leon et al. |
| 2008/0080827 A1 | 4/2008 | Leon et al. |
| 2008/0080828 A1 | 4/2008 | Leon et al. |
| 2008/0085094 A1 | 4/2008 | Krampotich |
| 2008/0089656 A1 | 4/2008 | Wagner et al. |
| 2008/0095502 A1 | 4/2008 | McColloch |
| 2008/0095541 A1 | 4/2008 | Dallesasse |
| 2008/0100440 A1 | 5/2008 | Downie et al. |
| 2008/0106871 A1 | 5/2008 | James |
| 2008/0112681 A1 | 5/2008 | Battey et al. |
| 2008/0118207 A1 | 5/2008 | Yamamoto et al. |
| 2008/0121423 A1 | 5/2008 | Vogel et al. |
| 2008/0124039 A1 | 5/2008 | Gniadek et al. |
| 2008/0131068 A1 | 6/2008 | Mertesdorf et al. |
| 2008/0145013 A1 | 6/2008 | Escoto et al. |
| 2008/0152294 A1 | 6/2008 | Hirano et al. |
| 2008/0166094 A1 | 7/2008 | Bookbinder et al. |
| 2008/0166131 A1 | 7/2008 | Hudgins et al. |
| 2008/0175541 A1 | 7/2008 | Lu et al. |
| 2008/0175550 A1 | 7/2008 | Coburn et al. |
| 2008/0175551 A1 | 7/2008 | Smrha et al. |
| 2008/0175552 A1 | 7/2008 | Smrha et al. |
| 2008/0193091 A1 | 8/2008 | Herbst |
| 2008/0205823 A1 | 8/2008 | Luther et al. |
| 2008/0205843 A1 | 8/2008 | Castonguay et al. |
| 2008/0205844 A1 | 8/2008 | Castonguay et al. |
| 2008/0212928 A1 | 9/2008 | Kowalczyk et al. |
| 2008/0219632 A1 | 9/2008 | Smith et al. |
| 2008/0219634 A1 | 9/2008 | Rapp et al. |
| 2008/0236858 A1 | 10/2008 | Quijano |
| 2008/0247723 A1 | 10/2008 | Herzog et al. |
| 2008/0267573 A1 | 10/2008 | Douglas et al. |
| 2008/0285934 A1 | 11/2008 | Standish et al. |
| 2008/0292261 A1 | 11/2008 | Kowalczyk et al. |
| 2008/0296060 A1 | 12/2008 | Hawley et al. |
| 2008/0298763 A1 | 12/2008 | Appenzeller et al. |

(56) References Cited

U.S. PATENT DOCUMENTS

| | | |
|---|---|---|
| 2008/0304803 A1 | 12/2008 | Krampotich et al. |
| 2008/0310810 A1 | 12/2008 | Gallagher |
| 2009/0010607 A1 | 1/2009 | Elisson et al. |
| 2009/0016685 A1 | 1/2009 | Hudgins et al. |
| 2009/0022470 A1 | 1/2009 | Krampotich |
| 2009/0038845 A1 | 2/2009 | Fransen et al. |
| 2009/0060439 A1 | 3/2009 | Cox et al. |
| 2009/0060440 A1 | 3/2009 | Wright et al. |
| 2009/0067800 A1 | 3/2009 | Vazquez et al. |
| 2009/0074371 A1 | 3/2009 | Bayazit et al. |
| 2009/0080849 A1 | 3/2009 | Hankins et al. |
| 2009/0097813 A1 | 4/2009 | Hill |
| 2009/0110347 A1 | 4/2009 | Jacobsson |
| 2009/0121092 A1 | 5/2009 | Keith |
| 2009/0136194 A1 | 5/2009 | Barnes |
| 2009/0136195 A1 | 5/2009 | Smrha et al. |
| 2009/0136196 A1 | 5/2009 | Trebesch et al. |
| 2009/0146342 A1 | 6/2009 | Haney et al. |
| 2009/0148117 A1 | 6/2009 | Laurisch |
| 2009/0166404 A1 | 7/2009 | German et al. |
| 2009/0169163 A1 | 7/2009 | Abbott, III et al. |
| 2009/0175588 A1 | 7/2009 | Brandt et al. |
| 2009/0180749 A1 | 7/2009 | Douglas et al. |
| 2009/0184221 A1 | 7/2009 | Sculler |
| 2009/0185782 A1 | 7/2009 | Parikh et al. |
| 2009/0191891 A1 | 7/2009 | Ma et al. |
| 2009/0194647 A1 | 8/2009 | Keith |
| 2009/0196563 A1 | 8/2009 | Mullsteff et al. |
| 2009/0202214 A1 | 8/2009 | Holmberg et al. |
| 2009/0207577 A1 | 8/2009 | Fransen et al. |
| 2009/0208178 A1 | 8/2009 | Kowalczyk et al. |
| 2009/0208210 A1 | 8/2009 | Trojer et al. |
| 2009/0212679 A1 | 8/2009 | Frousiakis et al. |
| 2009/0214171 A1 | 8/2009 | Coburn et al. |
| 2009/0220200 A1 | 9/2009 | Sheau Tung Wong et al. |
| 2009/0220204 A1 | 9/2009 | Ruiz |
| 2009/0226142 A1 | 9/2009 | Barnes et al. |
| 2009/0238531 A1 | 9/2009 | Holmberg et al. |
| 2009/0245743 A1 | 10/2009 | Cote et al. |
| 2009/0252472 A1 | 10/2009 | Solheid et al. |
| 2009/0257726 A1 | 10/2009 | Redmann et al. |
| 2009/0257727 A1 | 10/2009 | Laurisch et al. |
| 2009/0257754 A1 | 10/2009 | Theodoras, II et al. |
| 2009/0263096 A1 | 10/2009 | Solheid et al. |
| 2009/0263122 A1 | 10/2009 | Helkey et al. |
| 2009/0267865 A1 | 10/2009 | Miller et al. |
| 2009/0269016 A1 | 10/2009 | Korampally et al. |
| 2009/0269018 A1 | 10/2009 | Frohlich et al. |
| 2009/0269019 A1 | 10/2009 | Andrus et al. |
| 2009/0274429 A1 | 11/2009 | Krampotich et al. |
| 2009/0274430 A1 | 11/2009 | Krampotich et al. |
| 2009/0274432 A1 | 11/2009 | Iwaya |
| 2009/0290842 A1 | 11/2009 | Bran de Leon et al. |
| 2009/0290843 A1 | 11/2009 | Reagan et al. |
| 2009/0297111 A1 | 12/2009 | Reagan et al. |
| 2009/0304342 A1 | 12/2009 | Adomeit et al. |
| 2009/0324189 A1 | 12/2009 | Hill et al. |
| 2010/0003000 A1 | 1/2010 | Rapp et al. |
| 2010/0012671 A1 | 1/2010 | Vrondran et al. |
| 2010/0027953 A1 | 2/2010 | Russell |
| 2010/0054681 A1 | 3/2010 | Biribuze et al. |
| 2010/0054682 A1 | 3/2010 | Cooke et al. |
| 2010/0054683 A1 | 3/2010 | Cooke et al. |
| 2010/0054684 A1 | 3/2010 | Cooke et al. |
| 2010/0054685 A1 | 3/2010 | Cooke et al. |
| 2010/0054686 A1 | 3/2010 | Cooke et al. |
| 2010/0054687 A1 | 3/2010 | Ye et al. |
| 2010/0061691 A1 | 3/2010 | Murano et al. |
| 2010/0061693 A1 | 3/2010 | Bran de Leon et al. |
| 2010/0074587 A1 | 3/2010 | Loeffelholz et al. |
| 2010/0080517 A1 | 4/2010 | Cline et al. |
| 2010/0086267 A1 | 4/2010 | Cooke et al. |
| 2010/0086274 A1 | 4/2010 | Keith |
| 2010/0111483 A1 | 5/2010 | Reinhardt et al. |
| 2010/0119201 A1 | 5/2010 | Smrha et al. |
| 2010/0129035 A1 | 5/2010 | Teo |
| 2010/0142544 A1 | 6/2010 | Chapel et al. |
| 2010/0142910 A1 | 6/2010 | Hill et al. |
| 2010/0150518 A1 | 6/2010 | Leon et al. |
| 2010/0158467 A1 | 6/2010 | Hou et al. |
| 2010/0166377 A1 | 7/2010 | Nair et al. |
| 2010/0178022 A1 | 7/2010 | Schroeder et al. |
| 2010/0202740 A1 | 8/2010 | Barlowe et al. |
| 2010/0202745 A1 | 8/2010 | Sokolowski et al. |
| 2010/0202748 A1 | 8/2010 | Pierce et al. |
| 2010/0220967 A1 | 9/2010 | Cooke et al. |
| 2010/0220968 A1 | 9/2010 | Dagley et al. |
| 2010/0247051 A1 | 9/2010 | Kowalczyk et al. |
| 2010/0266245 A1 | 10/2010 | Sabo |
| 2010/0278499 A1 | 11/2010 | Mures et al. |
| 2010/0296790 A1 | 11/2010 | Cooke et al. |
| 2010/0296791 A1 | 11/2010 | Makrides-Saravanos et al. |
| 2010/0310225 A1 | 12/2010 | Anderson et al. |
| 2010/0310226 A1 | 12/2010 | Wakileh et al. |
| 2010/0316334 A1 | 12/2010 | Kewitsch |
| 2010/0322554 A1 | 12/2010 | Barnes et al. |
| 2010/0322579 A1 | 12/2010 | Cooke et al. |
| 2010/0322580 A1 | 12/2010 | Beamon et al. |
| 2010/0322581 A1 | 12/2010 | Cooke et al. |
| 2010/0322582 A1 | 12/2010 | Cooke et al. |
| 2010/0322583 A1 | 12/2010 | Cooke et al. |
| 2010/0329624 A1 | 12/2010 | Zhou et al. |
| 2011/0008004 A1 | 1/2011 | Liao et al. |
| 2011/0069931 A1* | 3/2011 | Cote et al. ............... 385/100 |
| 2011/0073730 A1 | 3/2011 | Kitchen |
| 2011/0085774 A1 | 4/2011 | Murphy et al. |
| 2011/0085776 A1 | 4/2011 | Biribuze et al. |
| 2011/0097053 A1 | 4/2011 | Smith et al. |
| 2011/0097977 A1 | 4/2011 | Bubnick et al. |
| 2011/0129185 A1 | 6/2011 | Lewallen et al. |
| 2011/0129186 A1 | 6/2011 | Lewallen et al. |
| 2011/0186532 A1 | 8/2011 | Wu |
| 2011/0192631 A1 | 8/2011 | Burek et al. |
| 2011/0211799 A1 | 9/2011 | Conner et al. |
| 2011/0217014 A1 | 9/2011 | Dominique |
| 2011/0217016 A1 | 9/2011 | Mullsteff |
| 2011/0222821 A1 | 9/2011 | Pitwon et al. |
| 2011/0249950 A1 | 10/2011 | Chapa Ramirez et al. |
| 2011/0268404 A1 | 11/2011 | Cote et al. |
| 2011/0268405 A1 | 11/2011 | Cote et al. |
| 2011/0268407 A1 | 11/2011 | Cowen et al. |
| 2011/0268408 A1 | 11/2011 | Giraud et al. |
| 2011/0268413 A1 | 11/2011 | Cote et al. |
| 2011/0280537 A1 | 11/2011 | Cowen et al. |
| 2012/0025683 A1 | 2/2012 | Mattlin et al. |
| 2012/0051707 A1 | 3/2012 | Barnes et al. |
| 2012/0057838 A1 | 3/2012 | Hill et al. |
| 2012/0106899 A1 | 5/2012 | Choi |
| 2012/0183263 A1 | 7/2012 | Wu |
| 2012/0183289 A1 | 7/2012 | Lou et al. |
| 2012/0219263 A1 | 8/2012 | Beamon et al. |
| 2012/0288244 A1 | 11/2012 | Wu et al. |
| 2012/0288248 A1 | 11/2012 | Chapa Ramirez et al. |
| 2012/0301083 A1 | 11/2012 | Carter et al. |
| 2013/0004136 A1 | 1/2013 | Brower et al. |
| 2013/0058616 A1 | 3/2013 | Cote et al. |
| 2013/0077927 A1 | 3/2013 | O'Connor |
| 2013/0214108 A1 | 8/2013 | Irudayaraj et al. |
| 2013/0266282 A1 | 10/2013 | Cote et al. |
| 2013/0308916 A1 | 11/2013 | Buff et al. |
| 2014/0003782 A1 | 1/2014 | Blackwell, Jr. et al. |
| 2014/0010510 A1 | 1/2014 | Blackard |
| 2014/0112628 A1 | 4/2014 | Keenum et al. |

FOREIGN PATENT DOCUMENTS

| | | |
|---|---|---|
| CA | 2765835 A1 | 1/2011 |
| CH | 688705 A5 | 1/1998 |
| CN | 102460258 A | 5/2012 |
| DE | 8711970 U1 | 10/1987 |
| DE | 3726718 A1 | 2/1989 |
| DE | 3726719 A1 | 2/1989 |
| DE | 4030301 A1 | 3/1992 |
| DE | 4231181 C1 | 8/1993 |

(56) References Cited

FOREIGN PATENT DOCUMENTS

| | | |
|---|---|---|
| DE | 20115940 U1 | 1/2002 |
| DE | 10338848 A1 | 3/2005 |
| DE | 202005009932 U1 | 11/2005 |
| DE | 202007000556 U1 | 10/2007 |
| DE | 102007024476 A1 | 11/2008 |
| DE | 202010009385 U1 | 9/2010 |
| EP | 29512 A1 | 6/1981 |
| EP | 0105597 A2 | 4/1984 |
| EP | 0250900 A2 | 1/1988 |
| EP | 0408266 A2 | 1/1991 |
| EP | 0474091 A1 | 8/1991 |
| EP | 0468671 A1 | 1/1992 |
| EP | 0490698 A1 | 6/1992 |
| EP | 0529830 A1 | 3/1993 |
| EP | 0544004 A1 | 6/1993 |
| EP | 0547778 A1 | 6/1993 |
| EP | 0581527 A1 | 2/1994 |
| EP | 0620462 A1 | 10/1994 |
| EP | 0693699 A1 | 1/1996 |
| EP | 0720322 A2 | 7/1996 |
| EP | 0776557 A1 | 6/1997 |
| EP | 0940700 A2 | 9/1999 |
| EP | 0949522 A2 | 10/1999 |
| EP | 1041417 A2 | 10/2000 |
| EP | 1056177 A1 | 11/2000 |
| EP | 1065542 A1 | 1/2001 |
| EP | 1162485 A2 | 12/2001 |
| EP | 1203974 A2 | 5/2002 |
| EP | 1289319 A2 | 3/2003 |
| EP | 1310816 A2 | 5/2003 |
| EP | 1316829 A2 | 6/2003 |
| EP | 1367308 A1 | 12/2003 |
| EP | 1621907 A1 | 2/2006 |
| EP | 1777563 A1 | 4/2007 |
| EP | 2060942 A2 | 5/2009 |
| EP | 2159613 A2 | 3/2010 |
| FR | 1586331 A | 2/1970 |
| FR | 2123728 A5 | 9/1972 |
| FR | 2378378 A1 | 8/1978 |
| GB | 2241591 A | 9/1991 |
| GB | 2277812 A | 11/1994 |
| GB | 2367379 A | 4/2002 |
| GB | 2377839 A | 1/2003 |
| JP | 3060994 A | 3/1991 |
| JP | 3172806 A | 7/1991 |
| JP | 3281378 A | 12/1991 |
| JP | 5045541 A | 2/1993 |
| JP | 06018749 A | 1/1994 |
| JP | 7308011 A | 11/1995 |
| JP | 7318761 A | 12/1995 |
| JP | 8007308 A | 1/1996 |
| JP | 8248235 A | 9/1996 |
| JP | 8248237 A | 9/1996 |
| JP | 3487946 A | 10/1996 |
| JP | 8254620 A | 10/1996 |
| JP | 3279474 A | 10/1997 |
| JP | 9258033 A | 10/1997 |
| JP | 9258055 A | 10/1997 |
| JP | 2771870 B2 | 7/1998 |
| JP | 3448448 A | 8/1998 |
| JP | 10227919 A | 8/1998 |
| JP | 3478944 A | 12/1998 |
| JP | 10332945 A | 12/1998 |
| JP | 10339817 A | 12/1998 |
| JP | 11023858 A | 1/1999 |
| JP | 2000098138 A | 4/2000 |
| JP | 2000098139 A | 4/2000 |
| JP | 2000241631 A | 9/2000 |
| JP | 2001004849 A | 1/2001 |
| JP | 3160322 B2 | 4/2001 |
| JP | 2001133636 A | 5/2001 |
| JP | 3173962 B2 | 6/2001 |
| JP | 3176906 B2 | 6/2001 |
| JP | 2001154030 A | 6/2001 |
| JP | 2001159714 A | 6/2001 |
| JP | 2002022974 A | 1/2002 |
| JP | 2002077236 A | 3/2002 |
| JP | 2002116337 A | 4/2002 |
| JP | 2002169035 A | 6/2002 |
| JP | 3312893 B2 | 8/2002 |
| JP | 2002305389 A | 10/2002 |
| JP | 3344701 B2 | 11/2002 |
| JP | 2003029054 A | 1/2003 |
| JP | 3403573 B2 | 5/2003 |
| JP | 2003169026 A | 6/2003 |
| JP | 2003215353 A | 7/2003 |
| JP | 2003344701 A | 12/2003 |
| JP | 3516765 B2 | 4/2004 |
| JP | 2004144808 A | 5/2004 |
| JP | 2004514931 A | 5/2004 |
| JP | 3542939 B2 | 7/2004 |
| JP | 2004246147 A | 9/2004 |
| JP | 2004361652 A | 12/2004 |
| JP | 2004361893 A | 12/2004 |
| JP | 3107704 U | 2/2005 |
| JP | 2005055748 A | 3/2005 |
| JP | 2005062569 A | 3/2005 |
| JP | 2005084241 A | 3/2005 |
| JP | 2005148327 A | 6/2005 |
| JP | 2005257937 A | 9/2005 |
| JP | 3763645 B2 | 4/2006 |
| JP | 3778021 B2 | 5/2006 |
| JP | 2006126513 A | 5/2006 |
| JP | 2006126516 A | 5/2006 |
| JP | 3794540 B2 | 7/2006 |
| JP | 2006227041 A1 | 8/2006 |
| JP | 3833638 B2 | 10/2006 |
| JP | 2006292924 A | 10/2006 |
| JP | 3841344 B2 | 11/2006 |
| JP | 3847533 B2 | 11/2006 |
| JP | 200747336 A | 2/2007 |
| JP | 3896035 B2 | 3/2007 |
| JP | 2007067458 A1 | 3/2007 |
| JP | 3934052 B2 | 6/2007 |
| JP | 3964191 B2 | 8/2007 |
| JP | 3989853 B2 | 10/2007 |
| JP | 4026244 B2 | 12/2007 |
| JP | 4029494 B2 | 1/2008 |
| JP | 4065223 B2 | 3/2008 |
| JP | 4093475 B2 | 6/2008 |
| JP | 4105696 B2 | 6/2008 |
| JP | 4112437 B2 | 7/2008 |
| JP | 4118862 B2 | 7/2008 |
| JP | 2008176118 A1 | 7/2008 |
| JP | 2008180817 A1 | 8/2008 |
| JP | 4184329 B2 | 11/2008 |
| JP | 2008271017 A | 11/2008 |
| JP | 2008542822 T | 11/2008 |
| JP | 2009503582 T | 1/2009 |
| JP | 2009229506 A | 10/2009 |
| JP | 2012065019 A | 3/2012 |
| KR | 20110037404 A | 4/2011 |
| WO | 9105281 A1 | 4/1991 |
| WO | 9326070 A1 | 12/1993 |
| WO | 9520175 A1 | 7/1995 |
| WO | 9636896 A1 | 11/1996 |
| WO | 9638752 A1 | 12/1996 |
| WO | 9712268 A1 | 4/1997 |
| WO | 9722025 A1 | 6/1997 |
| WO | 9736197 A1 | 10/1997 |
| WO | 9744605 A1 | 11/1997 |
| WO | 9825416 A1 | 6/1998 |
| WO | 9927404 A1 | 6/1999 |
| WO | 0005611 A2 | 2/2000 |
| WO | 0127660 A2 | 4/2001 |
| WO | 0130007 A2 | 4/2001 |
| WO | 0180596 A1 | 10/2001 |
| WO | 0242818 A1 | 5/2002 |
| WO | 03009527 A2 | 1/2003 |
| WO | 03014943 A1 | 2/2003 |
| WO | 2004052066 A1 | 6/2004 |
| WO | 2005020400 A1 | 3/2005 |
| WO | 2006076062 A | 7/2006 |
| WO | 2006108024 A1 | 10/2006 |

(56) References Cited

FOREIGN PATENT DOCUMENTS

| WO | 2007050515 A1 | 5/2007 |
|---|---|---|
| WO | 2007079074 A2 | 7/2007 |
| WO | 2007089682 A2 | 8/2007 |
| WO | 2007149215 A2 | 12/2007 |
| WO | 2008027201 A2 | 3/2008 |
| WO | 2008063054 A2 | 5/2008 |
| WO | 2008113054 A2 | 9/2008 |
| WO | 2008157248 A1 | 12/2008 |
| WO | 2009026688 A1 | 3/2009 |
| WO | 2009029485 A1 | 3/2009 |
| WO | 2009030360 A1 | 3/2009 |
| WO | 2009120280 A2 | 10/2009 |
| WO | 2010024847 A2 | 3/2010 |
| WO | 2010080745 A1 | 7/2010 |
| WO | 2011005461 A1 | 1/2011 |
| WO | 2011011510 A2 | 1/2011 |

OTHER PUBLICATIONS

Non-final Office Action for U.S. Appl. No. 13/302,067 mailed Jun. 7, 2013, 13 pages.
Final Office Action for U.S. Appl. No. 12/771,473 mailed Jul. 19, 2013, 7 pages.
Notice of Allowance for U.S. Appl. No. 12/751,884 mailed Jul. 17, 2013, 8 pages.
Non-final Office Action for U.S. Appl. No. 12/940,585 mailed Aug. 16, 2013, 14 pages.
Final Office Action for U.S. Appl. No. 121953,134 mailed Aug. 23, 2013, 11 pages.
*Ex parte Quayle* Action for U.S. Appl. No. 12/953,164 mailed Aug. 16, 2013, 5 pages.
Non-final Office Action for U.S. Appl. No. 12/732,487 mailed Jul. 17, 2013, 22 pages.
Non-final Office Action and Interview Summary for U.S. Appl. No. 12/707,889 mailed Aug. 8, 2013, 15 pages.
Advisory Action for U.S. Appl. No. 12/953,039 mailed Jul. 12, 2013, 3 pages.
Advisory Action for U.S. Appl. No. 12/953,118 mailed Jul. 12, 2013, 3 pages.
Advisory Action for U.S. Appl. No. 12/641,617 mailed Jul. 29, 2013, 3 pages.
Non-Final Office Action for U.S. Appl. No. 12/953,039 mailed Jan. 11, 2013, 6 pages.
Non-Final Office Action for U.S. Appl. No. 12/952,912 mailed Dec. 28, 2012, 9 pages.
Non-Final Office Action for U.S. Appl. No. 12/953,118 mailed Jan. 7, 2013, 9 pages.
Annex to Form PCT/ISA/2006, Communication Relating to the Results of the Partial International Search, for PCT/US2009/004549 mailed Feb. 10, 2010, 2 pages.
Annex to Form PCT/ISA/206, Communication Relating to the Results of the Partial International Search, for PCT/US2009/004548 mailed Jan. 19, 2010, 2 pages.
Corning Cable Systems, "Corning Cable Systems Products for BellSouth High Density Shelves," Jun. 2000, 2 pages.
Corning Cable Systems, "Corning Cable Systems Quick Reference Guide for Verizon FTTP FDH Products," Jun. 2005, 4 pages.
Conner, M. "Passive Optical Design for RFOG and Beyond," Braodband Properties, Apr. 2009, pp. 78-81.
Corning Evolant, "Eclipse Hardware Family," Nov. 2009, 1 page.
Corning Evolant, "Enhanced Management Frame," Dec. 2009, 1 page.
Corning Evolant, "Enhanced Management Frame (EMF)," Specification Sheet, Nov. 2009, 24 pages.
Corning Cable Systems, "Evolant Solutions for Evolving Networks: Fiber Optic Hardware," Oct. 2002, 2 pages.
Corning Cable Systems, "Fiber Optic Hardware with Factory-Installed Pigtails: Features and Benefits," Nov. 2010, 12 pages.
Corning Cable Systems, "FiberManager System 1- and 3-Position Compact Shelves," Jan. 2003, 4 pages.
Corning Cable Systems, "FiberManager System Frame and Components," Jan. 2003, 12 pages.
Corning Cable Systems, "High Density Frame," Jul. 2001, 2 pages.
Corning Cable Systems, "High Density Frame (HDF) Connector-Splice Shelves and Housings," May 2003, 4 pages.
International Search Report for PCT/US10/35529 mailed Jul. 23, 2010, 2 pages.
International Search Report for PCT/US10/35563 mailed Jul. 23, 2012, 1 page.
International Search Report for PCT/US2008/002514 mailed Aug. 8, 2008, 2 pages.
International Search Report for PCT/US2008/010317 mailed Mar. 4, 2008, 2 pages.
International Search Report for PCT/US2009/001692 mailed Nov. 24, 2009, 5 pages.
International Search Report for PCT/US2010/024888 mailed Jun. 23, 2010, 5 pages.
International Search Report for PCT/US2010/027402 mailed Jun. 16, 2010, 2 pages.
Corning Cable Systems, "MTX Frames and Accessories," Feb. 2006, 4 pages.
PANDUIT, "Lock-in LC Duplex Clip," Accessed Mar. 22, 2012, 1 page.
International Search Report for PCT/US06/49351 mailed Apr. 25, 2008, 1 page.
International Search Report for PCT/US09/57069 mailed Mar. 24, 2010, 2 pages.
International Search Report for PCT/US2009/057244 mailed Nov. 9, 2009 3 pages.
International Search Report for PCTUS2009004548 mailed Mar. 19, 2010, 5 pages.
International Search Report for PCTUS2009004549 mailed Apr. 20, 2010, 6 pages.
SIECOR, "Single Shelf HDF with Slack Storage and Heat Shield (HH1-CSH-1238-1V-BS)," Jan. 1998, 12 pages.
Corning Cable Systems, "Mass Termination Xchange (MTX) Frame System Equipment Office Planning and Application Guide," SRP003-664, Issue 1, Mar. 2005, 57 pages.
Corning Cable Systems, "Mass Termination Xchange (MTX) Equipment Patch Cord Interbay Vertical Channel," SRP003-684, Issue 1, Mar. 2005, 8 pages.
Corning Cable Systems, "High Density Frame (HDF) Installation," SRP003-355, Issue 4, Sep. 2002, 18 pages.
Written Opinion for PCT/US2010/023901 mailed Aug. 25, 2011, 8 pages.
Advisory Action for U.S. Appl. No. 12/221,117 mailed Aug. 24, 2011, 3 pages.
Examiner's Answer to Appeal Brief for U.S. Appl. No. 12/221,117 mailed Mar. 29, 2012, 16 pages.
Final Office Action for U.S. Appl. No. 12/221,117 mailed Feb. 19, 2010, 7 pages.
Final Office Action for U.S. Appl. No. 12/221,117 mailed Jun. 10, 2011, 8 pages.
Non-final Office Action for U.S. Appl. No. 12/221,117 mailed Jul. 14, 2010, 7 pages.
Non-final Office Action for U.S. Appl. No. 12/221,117 mailed Jun. 9, 2009, 5 pages.
Non-final Office Action for U.S. Appl. No. 12/221,117 mailed Dec. 21, 2010, 7 pages.
Advisory Action for U.S. Appl. No. 12/394,483 mailed Feb. 16, 2012, 3 pages.
Final Office Action for U.S. Appl. No. 12/394,483 mailed Dec. 6, 2011, 14 pages.
Non-final Office Action for U.S. Appl. No. 12/394,483 mailed Jun. 17, 2011, 11 pages.
Advisory Action for U.S. Appl. No. 12/950,234 mailed Dec. 21, 2011, 3 pages.
Non-final Office Action for U.S. Appl. No. 12/950,234 mailed Jun. 17, 2011, 7 pages.
Non-final Office Action for U.S. Appl. No. 12/950,234 mailed Mar. 12, 2012, 10 pages.
Final Office Action for U.S. Appl. No. 12/950,234 mailed Oct. 14, 2011, 10 pages.

(56) References Cited

OTHER PUBLICATIONS

Advisory Action mailed May 12, 2011, for U.S. Appl. No. 12/323,423, 3 pages.
Final Rejection mailed Mar. 3, 2011, for U.S. Appl. No. 12/323,423, 17 pages.
Non-Final Rejection mailed Aug. 5, 2011, for U.S. Appl. No. 12/323,423, 13 pages.
Examination Report for European patent application 09789090.9-2216 mailed Aug. 29, 2011, 4 pages.
Examination Report for European patent application 09789090.9-2216 mailed Mar. 30, 2012, 6 pages.
Written Opinion of the International Searching Authority for International patent application PCT/US2009004548, mailed Apr. 5, 2011, 6 pages.
European Search Report for European patent application 09789090.9-2217 mailed Jan. 24, 2013, 5 pages.
Notice of Allowance for U.S. Appl. No. 13/090,621 mailed Apr. 22, 2013, 8 pages.
Final Office Action for U.S. Appl. No. 12/953,039 mailed May 1, 2013, 8 pages.
Final Office Action for U.S. Appl. No. 12/953,118 mailed May 3, 2013, 11 pages.
Final Office Action for U.S. Appl. No. 12/915,682 mailed Apr. 18, 2013, 9 pages.
Advisory Action for U.S. Appl. No. 12/952,960 mailed May 15, 2013, 2 pages.
Non-final Office Action for U.S. Appl. No. 12/952,960 mailed Jun. 20, 2013, 13 pages.
Non-final Office Action for U.S. Appl. No. 12/953,536 mailed Jun. 6, 2013, 21 pages.
Non-final Office Action for U.S. Appl. No. 11/820,300 mailed Apr. 25, 2012, 10 pages.
Final Office Action for U.S. Appl. No. 12/871,052 mailed Jul. 1, 2013, 12 pages.
Non-final Office Action for U.S. Appl. No. 12/940,699 mailed Jun. 26, 2013, 9 pages.
Notice of Allowance for U.S. Appl. No. 13/090,621 mailed Jun. 25, 2013, 8 pages.
Final Office Action for U.S. Appl. No. 12/952,912 mailed Aug. 30, 2013, 15 pages.
Advisory Action for U.S. Appl. No. 12/771,473 mailed Oct. 2, 2013, 3 pages.
Notice of Allowance for U.S. Appl. No. 12/641,617 mailed Sep. 4, 2013, 9 pages.
Notice of Allowance for U.S. Appl. No. 12/871,052 mailed Sep. 18, 2013, 9 pages.
Non-final Office Action for U.S. Appl. No. 12/953,039 mailed Sep. 12, 2013, 8 pages.
Non-final Office Action for U.S. Appl. No. 12/946,139 mailed Oct. 2, 2013, 18 pages.
Final Office Action for U.S. Appl. No. 12/394,114 mailed Oct. 4, 2013, 10 pages.
Non-final Office Action for U.S. Appl. No. 12/818,986 mailed Oct. 4, 2013, 19 pages.
Advisory Action for U.S. Appl. No. 12/953,134 mailed Nov. 4, 2013, 3 pages.
Final Office Action for U.S. Appl. No. 12/952,960 mailed Oct. 29, 2013, 8 pages.
Notice of Allowance for U.S. Appl. No. 13/292,130 mailed Oct. 18, 2013, 9 pages.
Non-final Office Action for U.S. Appl. No. 13/901,074 mailed Oct. 9, 2013, 6 pages.
Non-final Office Action for U.S. Appl. No. 12/956,446 mailed Sep. 6, 2013, 10 pages.
Final Office Action for U.S. Appl. No. 12/946,139 mailed Feb. 15, 2013, 17 pages.
Non-final Office Action for U.S. Appl. No. 12/751,884 mailed Feb. 15, 2013, 5 pages.
Non-final Office Action for U.S. Appl. No. 12/394,114 mailed Feb. 27, 2013, 8 pages.
Non-final Office Action for U.S. Appl. No. 12/819,065 mailed Mar. 4, 2013, 7 pages.
Final Office Action for U.S. Appl. No. 12/952,960 mailed Mar. 7, 2013, 13 pages.
Notice of Allowance for U.S. Appl. No. 12/732,487 mailed Mar. 19, 2013, 11 pages.
Non-final Office Action for U.S. Appl. No. 12/953,134 mailed Mar. 21, 2013, 9 pages.
Final Office Action for U.S. Appl. No. 12/641,617 mailed May 10, 2013, 21 pages.
Non-Final Rejection mailed Sep. 7, 2010, for U.S. Appl. No. 12/323,423, 18 pages.
Notice of Allowance for U.S. Appl. No. 12/323,423 mailed Jan. 24, 2012, 8 pages.
Examiner's Answer mailed Mar. 4, 2011, for U.S. Appl. No. 12/323,415, 11 pages.
Final Rejection mailed Jun. 25, 2010, for U.S. Appl. No. 12/323,415, 10 pages.
Non-Final Rejection mailed Aug. 5, 2011, for U.S. Appl. No. 12/323,415, 41 pages.
Non-final Office Action for U.S. Appl. No. 12/323,415 mailed Apr. 23, 2012, 11 pages.
Non-Final Rejection mailed Dec. 10, 2009, for U.S. Appl. No. 12/323,415, 7 pages.
Examiner's Answer to Appeal Brief for U.S. Appl. No. 11/320,062 mailed Dec. 8, 2011, 8 pages.
Final Office Action for U.S. Appl. No. 11/320,062 mailed Mar. 8, 2011, 8 pages.
Non-final Office Action for U.S. Appl. No. 11/320,062 mailed Jan. 15, 2010, 11 pages.
Non-final Office Action for U.S. Appl. No. 12/320,062 mailed Sep. 30, 2010, 7 pages.
Final Office Action for U.S. Appl. No. 11/439,086 mailed Feb. 4, 2010, 14 pages.
Non-final Office Action for U.S. Appl. No. 11/439,086 mailed May 3, 2010, 11 pages.
Non-final Office Action for U.S. Appl. No. 11/439,086 mailed Sep. 21, 2009, 10 pages.
Final Office Action for U.S. Appl. No. 12/079,481 mailed Mar. 18, 2010, 10 pages.
Non-final Office Action for U.S. Appl. No. 12/079,481 mailed Dec. 26, 2008, 9 pages.
Non-final Office Action for U.S. Appl. No. 12/079,481 mailed Sep. 16, 2009, 10 pages.
Notice of Allowance for U.S. Appl. No. 12/079,481 mailed Jun. 3, 2010, 6 pages.
Notice of Allowance for U.S. Appl. No. 12/079,481 mailed Oct. 4, 2010, 4 pages.
Final Office Action for U.S. Appl. No. 12/394,114 mailed Dec. 22, 2011, 8 pages.
Non-final Office Action for U.S. Appl. No. 12/394,114 mailed Mar. 16, 2012, 8 pages.
Non-final Office Action for U.S. Appl. No. 12/394,114 mailed Sep. 1, 2011, 7 pages.
Non-final Office Action for U.S. Appl. No. 12/323,373 mailed May 3, 2012, 7 pages.
Non-final Office Action for U.S. Appl. No. 11/809,474 mailed Apr. 8, 2008, 13 pages.
Non-final Office Action for U.S. Appl. No. 11/809,474 mailed Nov. 13, 2008, 10 pages.
Notice of Allowance for U.S. Appl. No. 11/809,474 mailed Jul. 6, 2009, 6 pages.
Final Office Action for U.S. Appl. No. 11/320,031 mailed Mar. 8, 2011, 8 pages.
Non-final Office Action for U.S. Appl. No. 11/320,031 mailed Jan. 5, 2010, 16 pages.
Non-final Office Action for U.S. Appl. No. 11/320,031 mailed Sep. 30, 2010, 7 pages.
Notice of Allowance for U.S. Appl. No. 11/320,031 mailed Nov. 15, 2011, 7 pages.
Non-final Office Action for U.S. Appl. No. 12/157,622 mailed Mar. 31, 2009, 9 pages.

(56) References Cited

OTHER PUBLICATIONS

Non-final Office Action for U.S. Appl. No. 12/157,622 mailed Oct. 15, 2009, 9 pages.
Notice of Allowance for U.S. Appl. No. 12/157,622 mailed Apr. 22, 2010, 4 pages.
Non-final Office Action for U.S. Appl. No. 12/323,395 mailed Dec. 8, 2011, 7 pages.
Non-final Office Action for U.S. Appl. No. 12/415,454 mailed Mar. 2, 2012, 5 pages.
Non-final Office Action for U.S. Appl. No. 12/415,454 mailed Sep. 6, 2011, 7 pages.
Notice of Allowance for U.S. Appl. No. 12/415,454 mailed Jan. 13, 2012, 5 pages.
Non-final Office Action for U.S. Appl. No. 12/576,769 mailed Feb. 2, 2012, 23 pages.
Notice of Allowance for U.S. Appl. No. 12/415,454 mailed Jun. 19, 2012, 5 pages.
International Search Report for PCT/US2010/023901 mailed Jun. 11, 2010, 3 pages.
Notice of Allowance for U.S. Appl. No. 12/576,769 mailed May 31, 2012, 9 pages.
Non-final Office Action for U.S. Appl. No. 12/576,806 mailed Dec. 13, 2011, 6 pages.
Notice of Allowance for U.S. Appl. No. 12/576,806 mailed Apr. 18, 2012, 5 pages.
Unknown, Author, "QuickNet SFQ Series MTP Fiber Optic Cassettes," Panduit Specification Sheet, Jan. 2009, 2 pages.
Unknown Author, "Cellular Specialties introduces the first simulated in-building location-based tracking solution," smart-grid.tmenet.com/news, Sep. 14, 2009, 2 pages.
Unknown Author, "CDMA Co-Pilot Transmitter," Cellular Specialties, Inc., Aug. 2009, 2 pages.
International Search Report for PCT/US2010/038986 mailed Aug. 18, 2010, 1 page.
International Search Report for PCT/US2009/066779 mailed Aug. 27, 2010, 3 pages.
"MPO Fiber Optic Rack Panels now available from L-com Connectivity Products," article dated Jun. 4, 2007, 16 pages, http://www.I-com.com/content/Article.aspx?Type=P&ID=438.
"19 Rack Panel with 16 MPO Fiber Optic Couplers—1U high," product page, accessed Oct. 23, 2012, 2 pages, http://www.I-com.com/item.aspx?id=9767#.UlbgG8XXay5.
"Drawing for L-com 1U Panel with 16 MTP couplers," May 15, 2007, 1 page, http://www.I-com.com/multimedia/eng_drawings/PR17516MTP.pdf.
"RapidNet Fibre MTP VHD Cassette," Brochure, Date Unknown, 1 page, http://www.hellermanntyton.se/documents/5000/576_fiber_1U.pdf.
"MPO for Gigabit Ethernet/FAS-NET MTP Solution," Brochure, Date Unknown, 11 pages, http://www.infinique.com/upload/13182286190.pdf.
"Hubbell OptiChannel High Density 144 Port 1U Fiber Enclosure," Brochure, Date Unknown, 2 pages, http://www.hubbell-premise.com/literature/PLDF010.pdf.
Non-final Office Action for U.S. Appl. No. 12/771,473 mailed Oct. 4, 2012, 6 pages.
Non-final Office Action for U.S. Appl. No. 12/819,081 mailed Aug. 21, 2012, 12 pages.
Notice of Allowance for U.S. Appl. No. 12/417,325 mailed Aug. 22, 2012, 7 pages.
Notice of Panel Decision for Pre-Appeal Brief for U.S. Appl. No. 12/417,325 mailed Aug. 8, 2012, 2 pages.
Advisory Action for U.S. Appl. No. 12/417,325 mailed Jun. 29, 2012, 3 pages.
Advisory Action for U.S. Appl. No. 12/417,325 mailed Jun. 12, 2012, 3 pages.
Final Office Action for U.S. Appl. No. 12/417,325 mailed Apr. 16, 2012, 6 pages.
Final Office Action for U.S. Appl. No. 12/417,325 mailed Feb. 7, 2012, 7 pages.
Non-final Office Action for U.S. Appl. No. 12/417,325 mailed Jun. 15, 2011, 6 pages.
Notice of Allowance for U.S. Appl. No. 12/487,929 mailed Sep. 12, 2012, 4 pages.
Notice of Allowance for U.S. Appl. No. 12/487,929 mailed Jun. 13, 2012, 8 pages.
Advisory Action for U.S. Appl. No. 12/487,929 mailed Apr. 17, 2012, 3 pages.
Final Office Action for U.S. Appl. No. 12/487,929 mailed Feb. 14, 2012, 6 pages.
Final Office Action for U.S. Appl. No. 12/487,929 mailed Dec. 5, 2011, 7 pages.
Non-final Office Action for U.S. Appl. No. 12/487,929 mailed May 23, 2011, 7 pages.
Notice of Allowance for U.S. Appl. No. 12/415,253 mailed Mar. 11, 2011, 7 pages.
Non-final Office Action for U.S. Appl. No. 12/415,253 mailed Jul. 12, 2010, 11 pages.
Final Office Action for U.S. Appl. No. 12/415,253 mailed Apr. 16, 2010, 9 pages.
Non-final Office Action for U.S. Appl. No. 12/415,253 mailed Sep. 30, 2009, 8 pages.
Non-final Office Action for U.S. Appl. No. 12/641,617 mailed Oct. 5, 2012, 21 pages.
Final Office Action for U.S. Appl. No. 12/630,938 mailed Jun. 1, 2012, 18 pages.
Non-final Office Action for U.S. Appl. No. 12/630,938 mailed Dec. 19, 2011, 15 pages.
Non-final Office Action for U.S. Appl. No. 12/751,884 mailed Jul. 2, 2012, 9 pages.
Non-final Office Action for U.S. Appl. No. 12/871,052 mailed Aug. 13, 2012, 8 pages.
Non-Final Office Action for U.S. Appl. No. 12/707,889 mailed Jan. 2, 2013, 7 pages.
Non-Final Office Action for U.S. Appl. No. 12/953,536 mailed Jan. 2, 2013, 20 pages.
Final Office Action for U.S. Appl. No. 12/394,114 mailed Oct. 25, 2012, 8 pages.
Non-final Office Action for U.S. Appl. No. 12/732,487 mailed Sep. 19, 2012, 22 pages.
Non-final Office Action for U.S. Appl. No. 12/818,986 mailed Feb. 3, 2012, 12 pages.
Final Office Action for U.S. Appl. No. 12/818,986 mailed Oct. 18, 2012, 13 pages.
Non-final Office Action for U.S. Appl. No. 12/952,960 mailed Oct. 4, 2012, 11 pages.
Non-final Office Action for U.S. Appl. No. 12/953,134 mailed Sep. 25, 2012, 8 pages.
Non-final Office Action for U.S. Appl. No. 12/915,682 mailed Oct. 24, 2012, 8 pages.
Non-final Office Action for U.S. Appl. No. 12/946,139 mailed Jul. 26, 2012, 12 pages.
European Search Report for patent application 10790017.7 mailed Nov. 8, 2012, 7 pages.
International Search Report and Written Opinion for PCT/US2011/035683 mailed Sep. 8, 2011, 15 pages.
International Search Report and Written Opinion for PCT/US2010/039218 mailed Oct. 27, 2010, 13 pages.
International Search Report and Written Opinion for PCT/US2011/035684 mailed Jul. 1, 2011, 11 pages.
International Search Report and Written Opinion for PCT/US11/61754 mailed Mar. 26, 2012, 9 pages.
First Office Action for Chinese patent application 201080032453.2 issued Mar. 26, 2013, 6 pages.
Chinese Search Report for Chinese patent application 201080032453.2 mailed May 15, 2013, 2 pages.
First Office Action for Chinese patent application 201080031621.6 mailed Sep. 26, 2013, 9 pages.
Chinese Search Report for Chinese patent application 201080031621.6 mailed Sep. 13, 2013, 2 pages.

(56) References Cited

OTHER PUBLICATIONS

Ramdas, "Modern File Systems and Storage," Proceedings of the 2nd International SANE Conference, May 22-25, 2000, MECC, Maastricht, The Netherlands, Copyright Rodney R. Ramdas, 10 pages.
Author Unknown, "144 Fiber Patch Panel 1U," Technical Data, ADTEK Group Limited, 2009, 2 pages.
Non-final Office Action for U.S. Appl. No. 13/603,894 mailed Oct. 3, 2013, 9 pages.
Advisory Action for U.S. Appl. No. 12/394,114 mailed Jan. 2, 2014, 3 pages.
Notice of Allowance for U.S. Appl. No. 12/871,052 mailed Dec. 24, 2013, 9 pages.
Final Office Action for U.S. Appl. No. 12/953,039 mailed Dec. 27, 2013, 10 pages.
Advisory Action for U.S. Appl. No. 12/952,960 mailed Jan. 8, 2014, 3 pages.
Advisory Action for U.S. Appl. No. 12/952,912 mailed Nov. 26, 2013, 3 pages.
Examiner's Answer to the Appeal Brief for U.S. Appl. No. 12/953,118 mailed Dec. 3, 2013, 6 pages.
Final Office Action for U.S. Appl. No. 12/732,487 mailed Dec. 6, 2013, 24 pages.
Final Office Action for U.S. Appl. No. 12/956,446 mailed Dec. 23, 2013, 12 pages.
Non-final Office Action for U.S. Appl. No. 12/953,536 mailed Dec. 17, 2013, 21 pages.
Non-final Office Action for U.S. Appl. No. 12/819,065 mailed Dec. 3, 2013, 8 pages.
International Search Report and Written Opinion for PCT/US2011/062353 mailed Apr. 10, 2012, 15 pages.
Non-final Office Action for U.S. Appl. No. 13/621,958 mailed Feb. 13, 2014, 10 pages.
Non-final Office Action for U.S. Appl. No. 13/649,417 mailed Feb. 13, 2014, 10 pages.
Non-final Office Action for U.S. Appl. No. 12/953,003 mailed Apr. 14, 2014, 13 pages.
Non-final Office Action for U.S. Appl. No. 12/953,039 mailed Apr. 15, 2014, 8 pages.
Final Office Action for U.S. Appl. No. 12/946,139 mailed Apr. 22, 2014, 18 pages.
Final Office Action for U.S. Appl. No. 13/901,074 mailed May 9, 2014, 7 pages.
International Search Report for PCT/US2013/041268 mailed Aug. 20, 2013, 5 pages.
Notice of Allowance for U.S. Appl. No. 13/292,130 mailed Feb. 14, 2014, 7 pages.
Final Office Action for U.S. Appl. No. 12/707,889 mailed Feb. 11, 2014, 17 pages.
Non-final Office Action for U.S. Appl. No. 12/940,699 mailed Feb. 3, 2014, 10 pages.
Notice of Allowance for U.S. Appl. No. 12/952,960 mailed Feb. 13, 2014, 7 pages.
Notice of Allowance and Applicant-Initiated Interview Summary for U.S. Appl. No. 12/771,473 mailed Feb. 27, 2014, 8 pages.
Non-final Office Action for U.S. Appl. No. 13/081,856 mailed Nov. 26, 2013, 11 pages.
Non-final Office Action for U.S. Appl. No. 13/688,675 mailed Jan. 31, 2014, 13 pages.
Non-final Office Action for U.S. Appl. No. 13/663,975 mailed Jan. 31, 2014, 18 pages.
Non-final Office Action for U.S. Appl. No. 12/394,114 mailed Mar. 21, 2014, 9 pages.
Final Office Action for U.S. Appl. No. 12/940,585 mailed Mar. 18, 2014, 15 pages.
Non-final Office Action for U.S. Appl. No. 12/953,101 mailed Apr. 3, 2014, 9 pages.
Advisory Action for U.S. Appl. No. 12/956,446 mailed Mar. 20, 2014, 3 pages.
Final Office Action for U.S. Appl. No. 13/603,894 mailed Mar. 20, 2014, 15 pages.
Advisory Action for U.S. Appl. No. 12/953,039 mailed Mar. 6, 2014, 3 pages.
International Search Report for PCT/US2012/023622 mailed Mar. 9, 2012, 4 pages.
International Search Report for PCT/US2012/023635 mailed Sep. 14, 2012, 3 pages.
International Search Report for PCT/US2012/023626 mailed May 22, 2012, 4 pages.
Notice of Allowance for U.S. Appl. No. 13/951,916 mailed Dec. 16, 2013, 12 pages.
International Preliminary Report on Patentability for PCT/US2012/052958 mailed Mar. 13, 2014, 14 pages.
Non-final Office Action for U.S. Appl. No. 12/947,883 mailed Sep. 6, 2013, 9 pages.
Final Office Action for U.S. Appl. No. 12/947,883 mailed Mar. 31, 2014, 13 pages.
Final Office Action for U.S. Appl. No. 12/946,217 mailed Apr. 25, 2014, 40 pages.
Non-final Office Action for U.S. Appl. No. 13/833,876 mailed Apr. 24, 2014, 7 pages.
Notice of Allowance for U.S. Appl. No. 12/953,536 mailed May 20, 2014, 9 pages.
Advisory Action for U.S. Appl. No. 12/707,889 mailed Jun. 11, 2014, 4 pages.
Advisory Action for U.S. Appl. No. 12/940,585 mailed Jun. 17, 2014, 3 pages.
Advisory Action for U.S. Appl. No. 12/947,883 mailed Jun. 19, 2014, 3 pages.
Non-final Office Action for U.S. Appl. No. 12/732,487 mailed Jun. 20, 2014, 24 pages.
Non-final Office Action for U.S. Appl. No. 13/621,958 mailed Jun. 20, 2014, 13 pages.
Final Office Action for U.S. Appl. No. 13/649,417 mailed Jun. 25, 2014, 9 pages.
Non-final Office Action for U.S. Appl. No. 12/952,960 mailed Jun. 26, 2014, 13 pages.
Non-final Office Action for U.S. Appl. No. 13/746,938 mailed Jul. 11, 2014, 9 pages.
Non-final Office Action for U.S. Appl. No. 12/751,895 mailed May 20, 2014, 9 pages.
Notice of Allowance for U.S. Appl. No. 13/533,093 mailed Jul. 8, 2014, 9 pages.
Decision on Appeal for U.S. Appl. No. 12/221,117 mailed Jul. 1, 2014, 7 pages.
Notice of Allowance for U.S. Appl. No. 13/455,646 mailed Jun. 2, 2014, 9 pages.
Notice of Allowance for U.S. Appl. No. 12/221,117 mailed Jul. 16, 2014, 7 pages.
Non-final Office Action for U.S. Appl. No. 12/819,065 mailed Jul. 18, 2014, 10 pages.
Final Office Action for U.S. Appl. No. 12/818,986 mailed Jul. 18, 2014, 27 pages.
Final Office Action for U.S. Appl. No. 13/081,856 mailed Jul. 2, 2014, 8 pages.
International Search Report for PCT/US2011/030446 mailed Jul. 14, 2011, 2 pages.
International Search Report for PCT/US2011/030448 mailed Jul. 20, 2011, 2 pages.
International Search Report for PCT/US2011/030466 mailed Aug. 5, 2011, 2 pages.
International Search Report for PCT/US2012/052958 mailed Mar. 1, 2013, 7 pages.
International Search Report for PCT/US2013/041266 mailed Aug. 20, 2013, 4 pages.
Non-final Office Action for U.S. Appl. No. 13/663,949 mailed Feb. 3, 2014, 19 pages.
Non-final Office Action for U.S. Appl. No. 12/946,217 mailed Jul. 26, 2012, 25 pages.
Final Office Action for U.S. Appl. No. 121946,217 mailed Mar. 18, 2013, 48 pages.

(56) References Cited

OTHER PUBLICATIONS

Non-final Office Action for U.S. Appl. No. 12/946,217 mailed Oct. 3, 2013, 47 pages.
Final Office Action for U.S. Appl. No. 12/953,039 mailed Jul. 25, 2014, 10 pages.
Advisory Action for U.S. Appl. No.12/953,039 mailed Oct. 3, 2014, 3 pages.
Notice of Allowance for U.S. Appl. No. 12/953,536 mailed Aug. 28, 2014, 9 pages.
Final Office Action for U.S. Appl. No. 13/901,074 mailed Sep. 5, 2014, 7 pages.
Final Office Action for U.S. Appl. No. 13/663,975 mailed Aug. 14, 2014, 42 pages.
Corrected Notice of Allowance for U.S. Appl. No. 13/533,093 mailed Sep. 2, 2014, 7 pages.
Notice of Allowance for U.S. Appl. No. 13/649,417 mailed Sep. 8, 2014, 7 pages.
Examiner's Answer to the Appeal for U.S. Appl. No. 12/952,912 mailed Sep. 11, 2014, 15 pages.
Advisory Action and Examiner-Initiated Interview Summary for U.S. Appl. No. 13/081,856 mailed Sep. 16, 2014, 4 pages.
Notice of Allowance for U.S. Appl. No. 13/455,646 mailed Sep. 26, 2014, 9 pages.
Non-Final Office Action for U.S. Appl. No. 13/663,949 mailed Sep. 25, 2014, 21 pages.
Non-Final Office Action for U.S. Appl. No. 13/688,675 mailed Sep. 30, 2014, 9 pages.
Advisory Action for U.S. Appl. No. 12/953,039 mailed Oct. 3, 2014, 3 pages.
Decision on Appeal for U.S. Appl. No. 11/320,062 mailed Aug. 14, 2014, 8 pages.
Final Office Action for U.S. Appl. No. 12/953,101 mailed Oct. 20, 2014, 14 pages.
Notice of Allowance for U.S. Appl. No. 13/533,093 mailed Oct. 17, 2014, 9 pages.
Notice of Allowance for U.S. Appl. No. 12/732,487 mailed Oct. 7, 2014, 8 pages.
Non-Final Office Action for U.S. Appl. No. 13/567,288 mailed Oct. 8, 2014, 7 pages.
Advisory Action for U.S. Appl. No. 12/818,986 mailed Oct. 15, 2014, 5 pages.
Examiner's Answer to the Appeal Brief for U.S. Appl. No. 12/953,134 mailed Aug. 1, 2014, 7 pages.

* cited by examiner

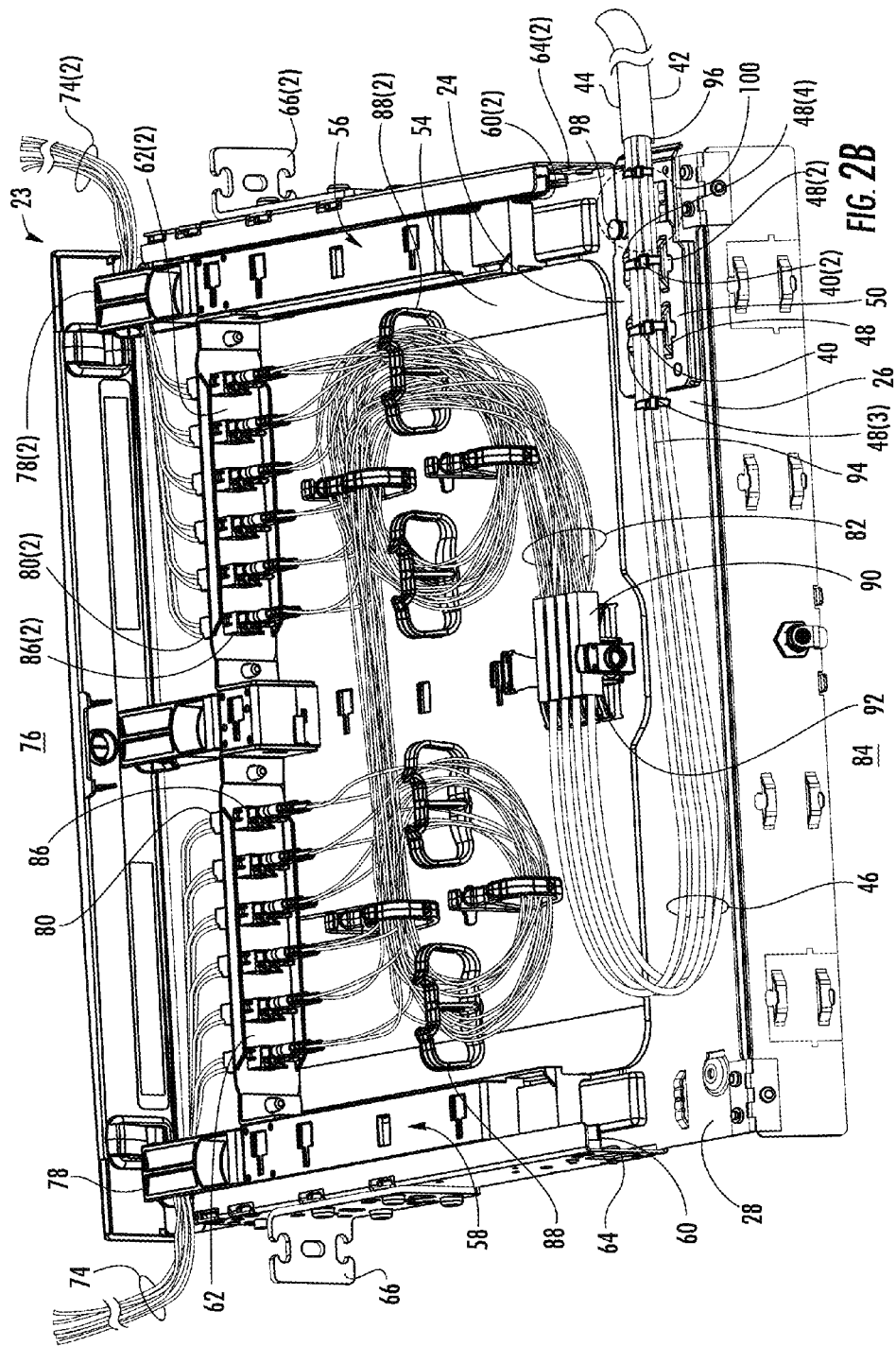

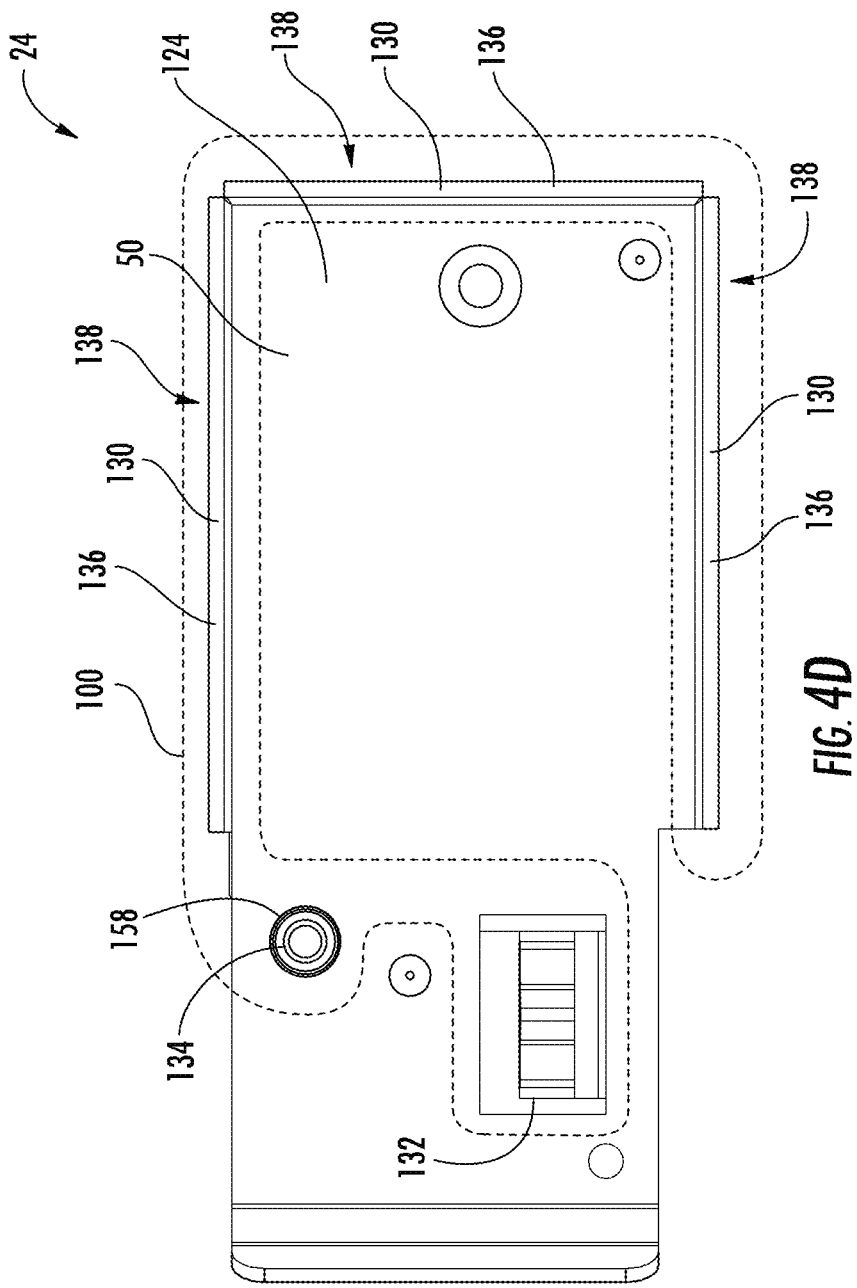

REMOVABLE STRAIN RELIEF BRACKETS FOR SECURING FIBER OPTIC CABLES AND/OR OPTICAL FIBERS TO FIBER OPTIC EQUIPMENT, AND RELATED ASSEMBLIES AND METHODS

RELATED APPLICATIONS

This application claims the benefit of priority under 35 U.S.C. §119 of U.S. Provisional Application Ser. No. 61/530,675 filed on Sep. 2, 2011 the content of which is relied upon and incorporated herein by reference in its entirety.

BACKGROUND

1. Field of the Disclosure

The technology of the disclosure relates to strain relief brackets and related assemblies and methods for securing fiber optic cable to fiber optic equipment.

2. Technical Background

Benefits of optical fiber use include extremely wide bandwidth and low noise operation. Because of these advantages, optical fiber is increasingly being used for a variety of applications, including but not limited to broadband voice, video, and data transmission. As a result, fiber optic communications networks include a number of interconnection points at which multiple optical fibers are interconnected. Fiber optic communications networks also include a number of connection terminals, examples of which include, but are not limited to, network access point (NAP) enclosures, aerial closures, below grade closures, pedestals, optical network terminals (ONTs), and network interface devices (NIDs). In certain instances, the connection terminals include connector ports, typically opening through an external wall of the connection terminal. The connection terminals are used to establish optical connections between optical fibers terminated from the distribution cable and respective optical fibers of one or more "preconnectorized" drop cables, extended distribution cables, tether cables or branch cables, collectively referred to herein as "drop cables." The connection terminals are used to readily extend fiber optic communications services to a subscriber. In this regard, fiber optic networks are being developed that deliver "fiber-to-the-curb" (FTTC), "fiber-to-the-business" (FTTB), "fiber-to-the-home" (FTTH) and "fiber-to-the-premises" (FTTP), referred to generically as "FTTx."

Fiber optic cables, such as trunk cables for example, may extend large distances between fiber optic equipment. Fiber optic cable routing can involve bending the fiber optic cable into the desired position. Bending fiber optic cable can impose bending strain on the fiber optic cable. Fiber optic cables are designed to tolerate a certain amount of bending strain without damaging the optical fibers disposed inside the fiber optic cable. Materials of the cable jacket and the inclusion of strength members inside the cable jacket can be selected to achieve the desired strain tolerance of a fiber optic cable. Even so, extreme bending strain on fiber optic cable beyond designed limits can risk damaging the optical fibers disposed inside the fiber optic cable. Further, bending of the fiber optic cable can cause undesired optical attenuation. Bending strain can also risk damaging optical fibers, such as furcated legs, exposed from the end portion of the fiber optic cable.

To prevent or reduce bending strain on a fiber optic cable, attachment devices may be employed. An attachment device may be attached to fiber optic equipment to secure fiber optic cable to the fiber optic equipment and provide strain relief for the fiber optic cable. In this regard, FIG. 1 is a partial, rear, perspective view of a fiber optic housing 10 illustrating an exemplary attachment device 12. The attachment device 12 is used to secure fiber optic cables 14A, 14B each containing one or more optical fibers 16A, 16B, respectively, to the fiber optic housing 10. The attachment device 12 in this example is L-shaped, with a flange 18 at one end having a plurality of openings 20. The openings 20 can receive fasteners 22, for example, cable ties or Velcro ties, to tie down and secure the fiber optic cables 14A, 14B and/or optical fibers 16A, 16B to the attachment devices 12 and in turn to the fiber optic housing 10.

Fiber optic equipment is being provided that supports greater densities of fiber optic connections. As the fiber optic connection density supported by fiber optic equipment increases, so does the number of fiber optic cables and/or optical fibers routed to the fiber optic equipment. The area dedicated in the fiber optic equipment to support attachment devices for securing fiber optic cables and/or optical fibers is usually limited. Thus, less area may be available in high-density fiber optic equipment for securing each fiber optic cable and/or optical fiber to the fiber optic equipment. As a result, it is becoming increasingly difficult to install and manage attachment devices in fiber optic equipment to secure greater numbers of fiber optic cables and/or optical fibers in a given area in the fiber optic equipment. Further, attachment devices may also not have capacity to handle increased numbers of fiber optic cables and/or optical fibers without obstructing access to the fiber optic equipment. Further, attachment devices may also not have sufficient load strength to secure and provide strain relief for larger diameter fiber optic cables that may be routed to fiber optic equipment to support providing increased numbers of optical fibers.

SUMMARY OF THE DETAILED DESCRIPTION

Embodiments disclosed herein include removable strain relief brackets for securing fiber optic cables and/or optical fiber to fiber optic equipment, and related assemblies and methods. The removable strain relief brackets may be employed to secure fiber optic cable and/or optical fibers routed to fiber optic equipment. The removable strain relief brackets may also be employed to provide strain relief for fiber optic cable and/or optical fibers routed and secured to fiber optic equipment. Fiber optic cable discussed herein includes optical fiber whether disposed in a common cable jacket or disposed freely of each other outside a cable jacket.

In this regard in one embodiment, a removable strain relief bracket to secure a fiber optic cable to fiber optic equipment is provided. The removable strain relief bracket includes a body and at least one lance raised off the body configured to be at least partially surrounded by a fastener disposed around a fiber optic cable. The removable strain relief device also includes an attachment system to removably attach the body to fiber optic equipment.

In another embodiment, fiber optic equipment is provided. This fiber optic equipment includes a housing and a removable strain relief bracket. The housing may comprise a mounting surface, at least one fiber optic connection, an orifice, and a mating feature. The at least one fiber optic connection may optically connect at least one optical fiber exposed from an end portion of a fiber optic cable. The orifice may be disposed through the mounting surface. The mating feature may be attached to the mounting surface. The removable strain relief bracket may be configured to be removably attached to the mounting surface and configured to be attached to the end portion of the fiber optic cable.

In another embodiment, a method is disclosed for securing an end portion of a fiber optic cable to fiber optic equipment. This method may include disposing an end portion of a fiber optic cable adjacent to at least one lance, the lance raised off a body of a removable strain relief bracket. The method may also include securing a fastener around the at least one lance of the removable strain relief bracket. The fastener may at least partially surround the lance and be disposed around the end portion of the fiber optic cable. The method may also include attaching the removable strain relief bracket to a mounting surface of a fiber optic equipment.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 2B is a perspective view of the removable strain relief bracket of FIG. 2A attached to the mounting surface of the fiber optic equipment housing which includes at least one fiber connection;

FIG. 4D is a bottom view of the removable strain relief bracket of FIG. 2A;

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include removable strain relief brackets for securing fiber optic cables and/or optical fiber to fiber optic equipment, and related assemblies and methods. The removable strain relief brackets may be employed to secure fiber optic cable and/or optical fibers routed to fiber optic equipment. The removable strain relief brackets may also be employed to provide strain relief for fiber optic cable and/or optical fibers routed and secure to fiber optic equipment. Fiber optic cable discussed herein includes optical fiber whether disposed in a common cable jacket or disposed freely of each other outside a cable jacket.

In this regard in one embodiment, a removable strain relief bracket to secure a fiber optic cable to fiber optic equipment is provided. The removable strain relief bracket includes a body and at least one lance raised off the body configured to be at least partially surrounded by a fastener disposed around a fiber optic cable. The removable strain relief device also includes an attachment system. The attachment system may include at least one abutment surface, a bent flange, and a pin. The at least one abutment surface may be disposed on the body and may be configured to contact a mounting surface of the fiber optic equipment. The bent flange may be disposed in the body and may be configured to communicate with the mounting surface and a mating feature of the mounting surface. The pin may be disposed through an orifice in the body and configured to enter into and depart from an orifice in the mounting surface.

Figure 1:
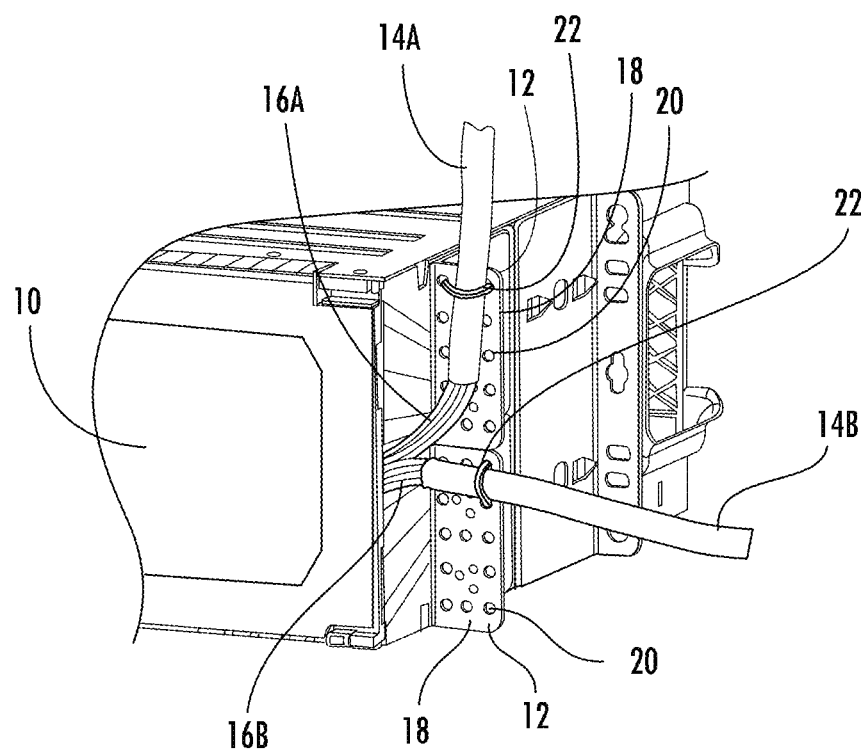
FIG. 1 illustrates partial, rear, perspective view of conventional strain relief brackets attached to a fiber optic housing in the prior art.
Figure 2A:
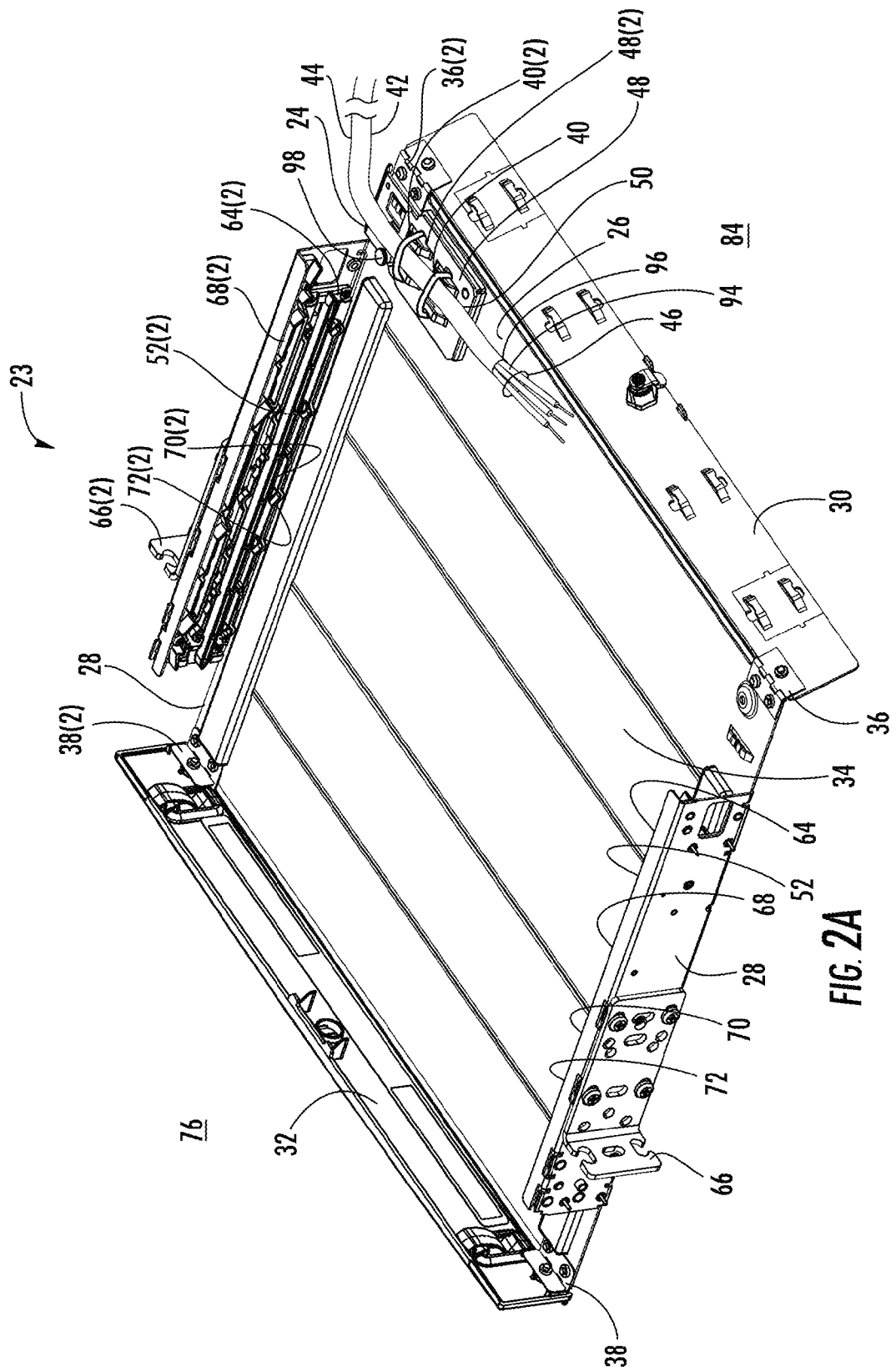
FIG. 2A is a perspective view of an exemplary removable strain relief bracket attached to a mounting surface of a fiber optic equipment housing.

In this regard, FIGS. 2A and 2B are perspective views of an exemplary removable strain relief bracket 24 to secure a fiber optic cable to fiber optic equipment 23. In this embodiment, the removable strain relief bracket 24 is attached to a mounting surface 26 of a fiber optic equipment housing 28 provided in the fiber optic equipment 23. The fiber optic equipment housing 28 may further include a rear door 30 and front door 32 connected to the bottom 34 of the fiber optic equipment housing 28 with rear hinges 36, 36(2) and front hinges 38, 38(2).

Various types of optical fibers or cables may be attached to the removable strain relief bracket 24. For example, either an outer jacket 42 of a fiber optic cable 44 as shown in FIG. 2A or subunit optical fibers 46 as depicted in FIG. 2B may be attached using one or more fasteners 40, 40(2) to the removable strain relief bracket 24. The lance 48, 48(2) may be configured to be at least partially surrounded by the fasteners 40, 40(2) disposed around the fiber optic cable 44 or the subunit optical fibers 46. The fasteners 40, 40(2) may be in the form of cable ties, tie-wraps, zip-ties, or Velcro® hook and loop fasteners. Using fasteners 40, 40(2) in the form of cable ties, tie-wraps, zip-ties, or Velcro® hook and loop fasteners can firmly hold the fiber optic cable 44 in place, but yet are easy to remove from the lances 48, 48(2) to remove the fiber optic cable 44. The fasteners 40, 40(2) support the removable strain relief bracket 24 being secured to the fiber optic cable 44 which will be later attached to the mounting surface 26.

With continuing reference to FIG. 2A and as will be discussed in more detail below, in this embodiment, the fiber optic cable 44 may be attached by the fasteners 40, 40(2) to at least one lance 48, 48(2) raised off a body 50 of the removable strain relief bracket 24. This embodiment allows the removable strain relief bracket 24 to be removable from the mounting surface 26 without the use of tools as will be discussed in more detail below. A non-limiting feature of the removable strain relief bracket 24 is that it may be installed in relatively small areas of the fiber optic equipment housing 28 where it may be difficult to utilize tools to install or de-install the fiber optic cable 44.

In this embodiment, tray guides 52, 52(2) are connected to opposite sides of the bottom 34 of the fiber optic equipment housing 28 to retain and allow the one or more fiber optic equipment trays 54 (shown in FIG. 2B) to move in and out of the fiber optic equipment housing 28. The tray guides 52, 52(2) may be disposed on both a left side end 56 and a right side end 58 of the fiber optic equipment tray 54. The tray guides 52, 52(2) are installed opposite and facing each other as part of the fiber optic equipment housing 28 to provide complementary tray guides 52, 52(2) for the tray rails 60, 60(2) of the fiber optic equipment trays 54 received therein. The tray guides 52, 52(2) and tray rails 60, 60(2) are also disclosed in U.S. patent application Ser. No. 12/940,585, which is incorporated hereby by reference in its entirety.

If it is desired to access a particular fiber optic equipment tray 54 and/or a particular connector panel 62, 62(2) in a fiber optic equipment tray 54, then the fiber optic equipment tray 54 can be pulled forward to cause the fiber optic equipment tray 54 to extend forward out from the fiber optic equipment housing 28. When access is completed, the fiber optic equipment tray 54 can be pushed back into the fiber optic equipment housing 28 wherein the tray rails 60, 60(2) move within the tray guides 52, 52(2) disposed as part of the fiber optic equipment housing 28.

The tray guide 52, 52(2) may be comprised of a guide panel 64, 64(2) attached to the fiber optic equipment housing 28. L-brackets 66, 66(2) may be utilized to attach the fiber optic equipment housing 28 to vertical rails (not shown) of a fiber optic equipment rack so that several of the fiber optic equipment housings 28 may be attached and supported by the vertical rails to thereby be stacked above and/or below each other in an arrangement within the vertical rails. One benefit of stacking the fiber optic equipment housings 28 to the vertical rails while still maintaining an efficient use of space may be realized by having a standard U-size height for each of the fiber optic equipment housings 28. The standard U-size height ensures the fiber optic equipment housings 28 may be stacked in a standard U-sized fiber optic equipment rack without wasted space between each one. The consequence of this objective is that no part of the removable strain relief bracket 24 may extend below the fiber optic equipment housing 28 to become an obstacle for the fiber optic equipment housing stacked below on the vertical rails.

With continuing reference to FIGS. 2A and 2B, the guide members 68, 68(2) are disposed in the guide panels 64, 64(2) and configured to receive the tray rails 60, 60(2) of the fiber optic equipment tray 54. Leaf springs 70, 70(2) may be disposed in each of the guide members 68, 68(2) of the tray guides 52, 52(2) and each are configured to provide stopping positions for the tray rails 60, 60(2) during movement of the fiber optic equipment tray 54 in the guide members. The leaf springs 70, 70(2) each contain detents 72, 72(2) that are configured to receive protrusions (not shown) disposed in the tray rails 60, 60(2) to provide stopping or resting positions in the range of motion of the fiber optic equipment trays 54 with respect to the fiber optic equipment housing 28.

In this regard, one or more front fiber optic cables 74, 74(2) may exit a front 76 of the fiber optic equipment housing 28 through front fiber routing guides 78, 78(2). The front fiber optic cables 74, 74(2) may be optically coupled to internal optical fibers 82 at one or more optical connectors 80, 80(2) attached to the connector panels 62, 62(2).

The internal optical fibers 82 may be terminated at fiber optic adapters 86, 86(2) disposed in the connector panels 62, 62(2). The internal optical fibers 82 may be routed through fiber routing guides 88, 88(2). The internal optical fibers 82 may extend from the fiber bodies 90 that are installed and supported in a fiber body holder 92. The fiber bodies 90 may be connected to the subunit optical fibers 46 that may contain the internal optical fibers 82. As shown in FIG. 2A, the subunit optical fibers 46 may enter a rear 84 of fiber optic equipment housing 28 and may be contained as part of the fiber optic cable 44. The outer jacket 42 of an end portion 94 of the fiber optic cable 44 may be stripped away to expose the subunit optical fibers 46 to a transition point 96.

Figure 3:
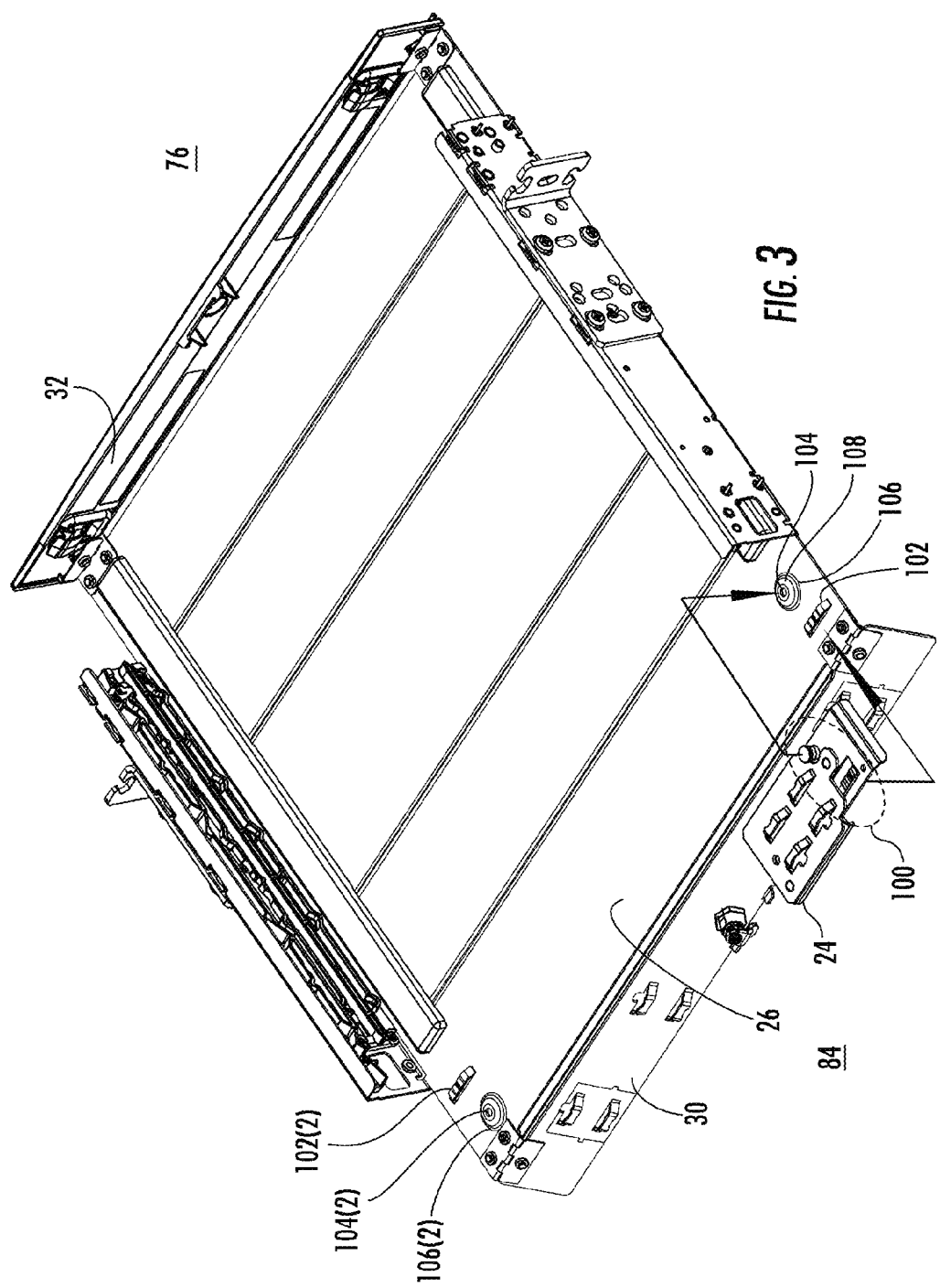
FIG. 3 depicts a perspective view of the removable strain relief bracket of FIG. 2A being attached to the mounting surface of fiber optic equipment housing.

With the fiber optic cable 44 having been discussed above in relation to the removable strain relief bracket 24, the attachment of the removable strain relief bracket 24 to the mounting surface will be discussed. FIG. 3 depicts a perspective view of the removable strain relief bracket 24 of FIGS. 2A and 2B being attached to the mounting surface 26 of the fiber optic equipment housing 28. The removable strain relief bracket 24 may include an attachment system 100. The attachment system 100 may allow for the removable strain relief bracket 24 to be attached and detached from the mounting surface 26. The attachment system 100 may communicate with the mounting surface 26, a mating feature 102 and an orifice 104 in the mounting surface 26. The orifice 104 in the mounting surface 26 may be disposed through a raised emboss 106 of the mounting surface 26. When the removable strain relief bracket 24 may be attached to the mounting surface 26, the raised emboss 106 may extend towards the removable strain relief bracket 24. The raised emboss 106 may have a curvilinear shape 108 to better interact with the attachment system 100 during attachment as discussed later.

Although only one of the removable strain relief brackets 24 has been discussed relative to a mounting surface 26, multiple removable strain relief brackets 24 may be attached to the rear 84 of the fiber optic equipment housing 28. FIG. 3 shows a second mating feature 102(2), orifice 104(2) and raised emboss 106(2) where a second removable strain relief bracket 24(2) could be attached. These additional features enable room for expansion and the ability to add additional fiber optic cables 44 without disturbing the fiber optic cable 44 attached to the removable strain relief bracket 24, already installed.

Figure 4A:
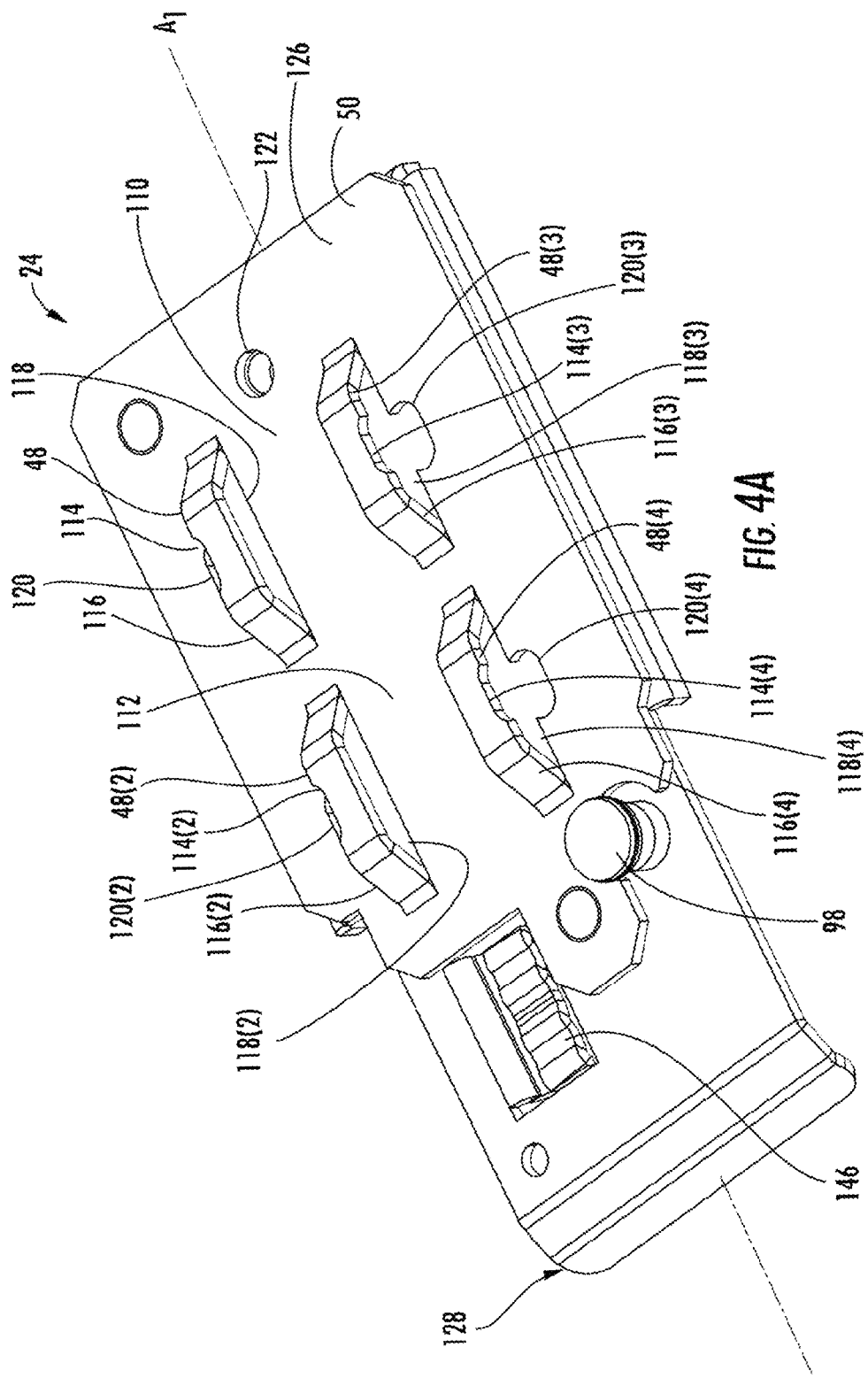
FIG. 4A illustrates a perspective view of the removable strain relief bracket of FIG. 2A.

The removable strain relief bracket 24 may include additional non-limiting features. In this regard as an example, FIGS. 4A through 4E provide more detail of the features of the removable strain relief bracket 24 of FIGS. 2A and 2B. FIG. 4A is a perspective top view of the removable strain relief bracket 24 showing the at least one lance 48, 48(2), 48(3), 48(4). The fiber optic cable 44 may be disposed in a portion 110 of the body 50 of the removable strain relief bracket 24 between the adjacent lances 48, 48(3) and may be disposed in a portion 112 of the body 50 between adjacent lances 48(2), 48(4). A fastener 40 disposed around the fiber optic cable 44 may at least partially surround the adjacent lances 48, 48(3) as shown in FIG. 2B. A fastener 40(2) disposed around the fiber optic cable 44 may at least partially surround the adjacent lances 48(2), 48(4) as shown in FIG. 2B. The lances 48, 48(2), 48(3), 48(4) may have recessed surfaces 114, 114(2), 114(3), 114(4) respectively to abut either the fastener 40 and/or fastener 40(2) to ensure that the fasteners 40, 40(2) are prevented from slipping in the longitudinal direction $A_1$. The advantage of disposing the fiber optic cable 44 between adjacent lances may be to prevent movement of the fiber optic cable 44 perpendicular to the longitudinal axis $A_1$.

Figure 4B:
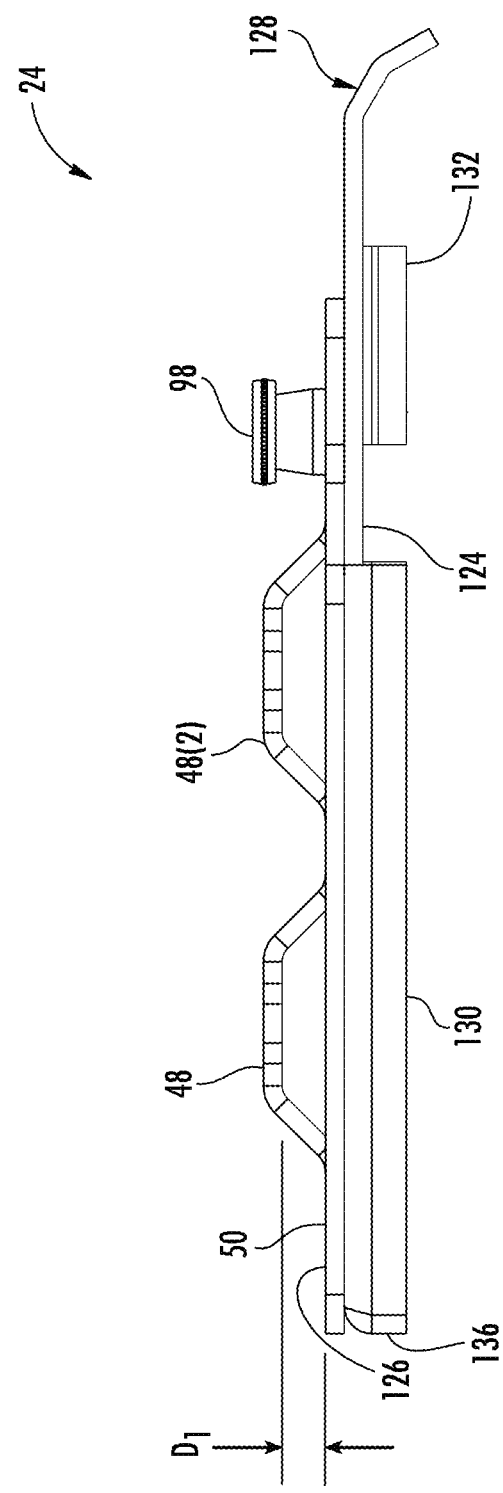
FIG. 4B is a side view of the removable strain relief bracket of FIG. 2A.
Figure 4C:
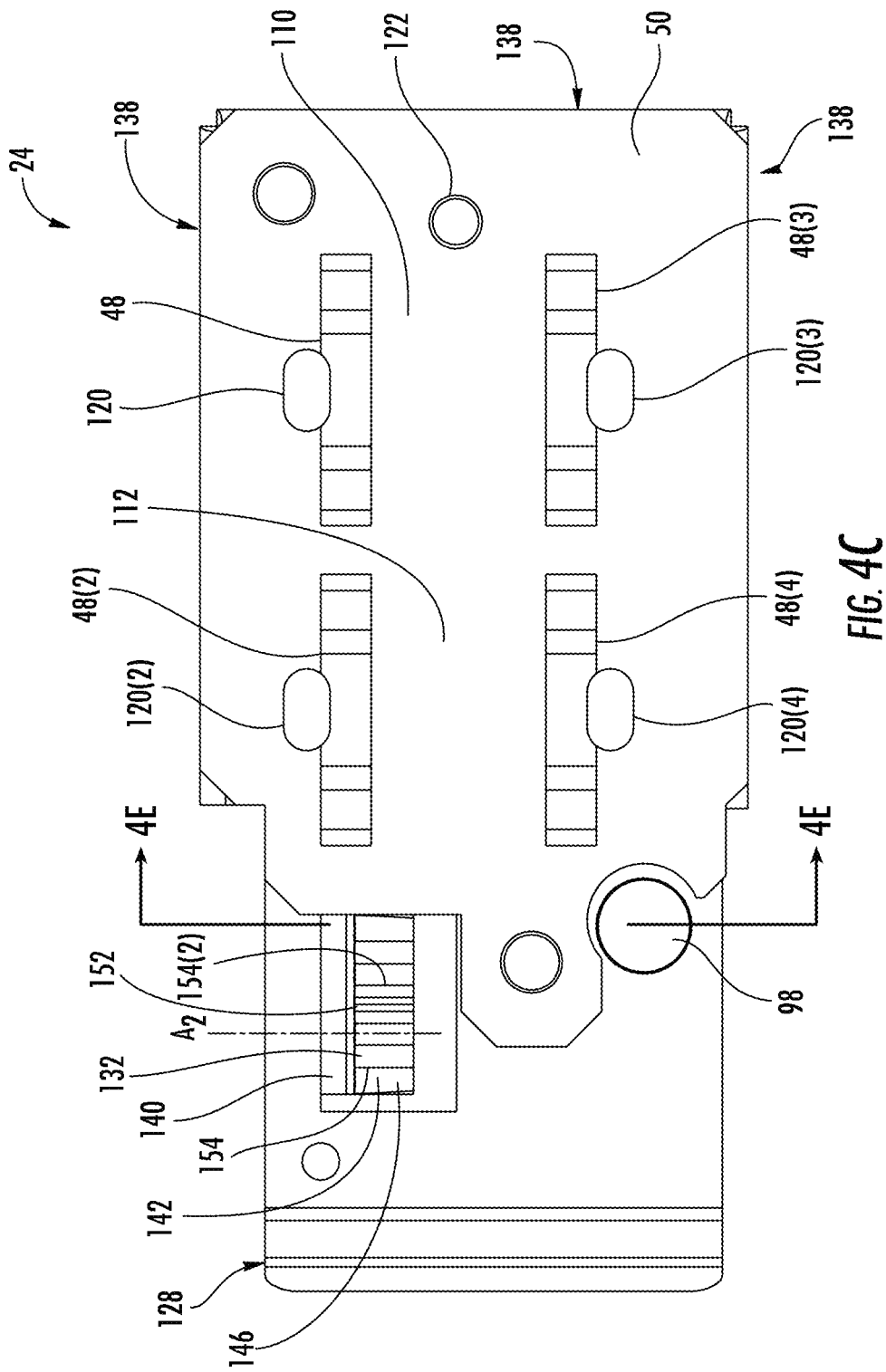
FIG. 4C is a top view of the removable strain relief bracket of FIG. 2A.

The lances 48, 48(2), 48(3), 48(4) have a structure convenient for connection to the body 50. The lances 48, 48(2), 48(3), 48(4) may be connected to the body 50 with at least one lance connector 116, 116(2), 116(3), 116(4) respectively. In FIGS. 4A through 4C each lance is shown having a pair of the lance connectors 116, 116(2), 116(3), 116(4). The lance connectors 116, 116(2), 116(3), 116(4) may enable the lances 48, 48(2), 48(3), 48(4) to be raised off the body 50 a distance D1 as shown in FIG. 4B and remain in a fixed position relative to the body 50. The advantage to being raised off the body 50 a distance $D_1$ is that the fasteners 40, 40(2) may be more easily disposed under the lances 48, 48(2), 48(3), 48(4) to permit them to be more easily surrounded by either of the fasteners 40, 40(2).

Moreover, the lances 48, 48(2), 48(3), 48(4) may be formed for ease of manufacturing and use. The lances 48, 48(2), 48(3), 48(4) may be disposed above openings 118, 118(2), 118(3), 118(4) respectively. The openings 118, 118(2), 118(3), 118(4) may be the result of metal forming operations that form the lances 48, 48(2), 48(3), 48(4) from the body 50. The openings 118, 118(2), 118(3), 118(4) may include cutouts 120, 120(2), 120(3), 120(4) which increase the size of the openings 118, 118(2), 118(3), 118(4) to enable the fasteners 40, 40(2) to also be more easily disposed under the lances 48, 48(2), 48(3), 48(4).

A Kevlar strength member of a fiber optic cable 44 may be directly attached to the removable strain relief bracket 24 without being attached to the lances 48, 48(2), 48(3), 48(4). The body 50 may also include a tie-down hole 122 which permits a second fastener (not shown) to allow a Kevlar strength member from the fiber optic cable 44 to be wrapped around the second fastener and fastened to the tie-down hole 122. The tie down-hole 122 may be generally disposed between the adjacent lances 48, 48(3). The advantage of the tie-down hole 122 is that it enables the fiber optic cable 44 to establish a strong connection to the removable strain relief bracket 24 when the fiber optic cable 44 is of a type that has a Kevlar strength member.

The body 50 may include a bottom surface 124 that may face the mounting surface 26 when the removable strain relief bracket 24 is attached to the mounting surface 26 (as shown later in FIG. 6B). The body 50 may also include a top surface 126 opposite the bottom surface 124. The top surface 126 may face away from the mounting surface when the removable strain relief bracket 24 is attached to the mounting surface 26 as shown later in FIG. 6B. The at least one lance 48, 48(2), 48(3), 48(4) may be disposed above the top surface 126 of the body 50 as shown later in FIG. 4B.

The fiber optic cable 44 may be susceptible to damage by being bent to a radius of curvature that is tighter than that specified for the cable and signal degradation and/or damage may occur. Most frequently, the fiber optic cables 44 may need to be protected against severe bending when they are adjacent to corners, for example, when they enter or depart from the fiber optic equipment housing 28. In this regard, a waterfall 128 may be included as part of the body 50. The waterfall 128 may be in the form of a curvilinear surface attached to the top surface 126 and curved away from the top surface 126 and towards the bottom surface 124. The waterfall 128 may be configured to manage a bend radius of the fiber optic cable 44 connected to the removable strain relief bracket 24.

Figure 6A:
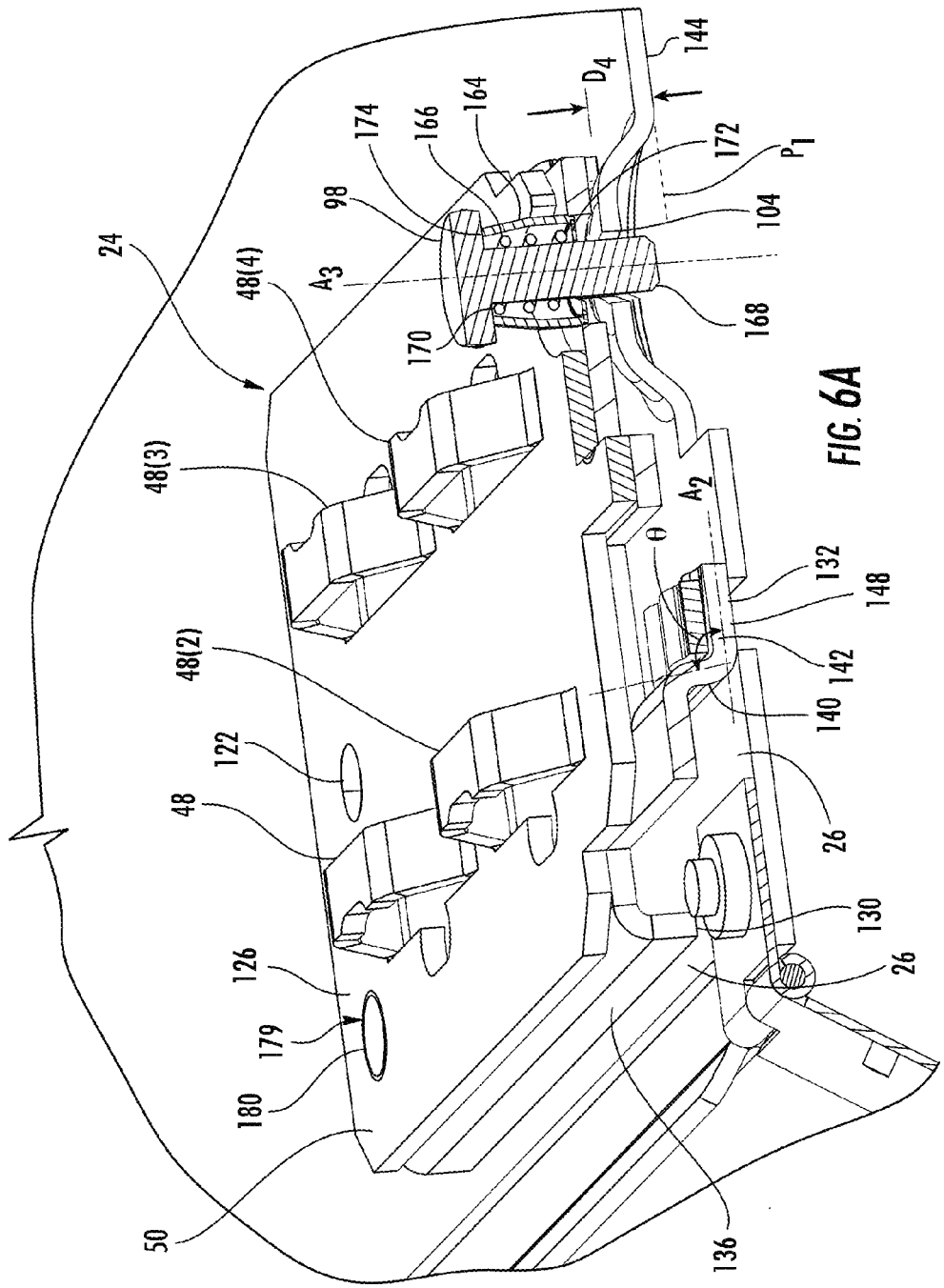
FIG. 6A is a perspective partial cutaway view of the removable strain relief bracket of FIG. 2A attached to the mounting surface.

The main features of the attachment system 100 to attach and detach the removable strain relief bracket 24 from the mounting surface 26 of the fiber optic equipment housing 28 may be located at the bottom of the removable strain relief bracket 24. In this regard, FIG. 4D depicts a bottom view of the removable strain relief bracket 24 of FIG. 2A. FIG. 4D illustrates the main working elements of the attachment system 100. The attachment system 100 may include at least one abutment surface 130, a bent flange 132, and a pin 134. The abutment surface 130 may be disposed on the body 50 and configured to contact the mounting surface 26 as shown in FIG. 6A. The abutment surfaces 130 may be formed from one or more turn-down flanges 136 disposed on the body 50. One or more of the turn-down flanges 136 may be disposed along a perimeter 138 of the bottom surface 124 and turned away from the top surface 126 of the body 50. The turn-down flanges 136 allow the body 50 to be raised above the raised emboss 106 of the mounting surface 26 as is depicted in FIG. 6B. The raised emboss 106 may extend a distance $D_4$ above the mounting surface 26 as shown in FIG. 6A, so the turn-down flanges 136 may allow the body 50 to be raised above the distance $D_4$ to be higher than the raised emboss 106. The abutment surfaces 130 in combination with the turn-down flanges 136 ensure that the bottom surface 124 of the body 50 remains a fixed distance $D_2$ above the mounting surface 26 and thereby a fixed distance $D_3$ from a geometric plane $P_1$ coincident with a bottom planar surface 144 of the fiber optic equipment housing 28 as shown in FIGS. 6A and 6B. When the fiber optic equipment housing 28 is arranged in the standard U-sized fiber optic equipment rack as mentioned earlier, then it is important that no part of the fiber optic equipment housing 28 extends below the bottom of the fiber optic equipment housing 28 or else it will extend into a space reserved for the fiber optic equipment housing 28 located immediately below.

Figure 4E:
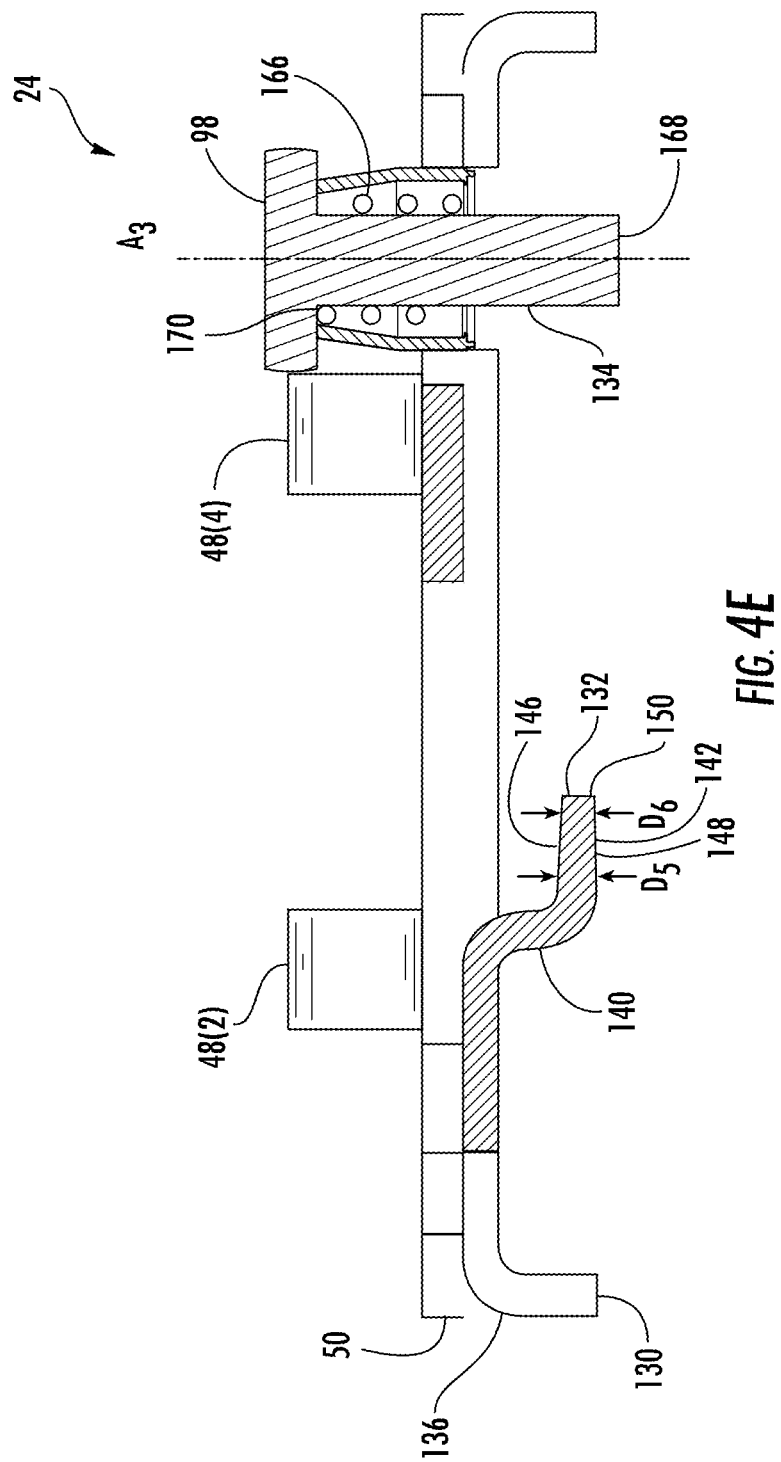
FIG. 4E is a side partial cutaway view of the removable strain relief bracket of FIG. 2A showing a taper of the bent flange.

With continuing reference to FIGS. 4A through 4E, the bent flange 132 may be disposed in the body 50 and help prevent torsional movement of the removable strain relief bracket 24 of FIG. 2A with respect to the mounting surface 26. The bent flange 132 may include a first portion 140 and a second portion 142. The first portion 140 may extend from the bottom surface 124. The second portion 142 may comprise a first mating surface 146 and a second mating surface 148 opposite the first mating surface 146. The second portion 142 may be disposed at an angle θ (theta) with respect to the first portion 140 and extend toward a distal end 150 of the bent flange 132 along a second portion axis $A_2$ (see FIG. 6A). The angle θ (theta) may be ninety (90) degrees. The second portion 142 of the bent flange 132 may be tapered from the first portion 140 toward the distal end 150 of the bent flange 132 as shown in FIG. 4E wherein distance $D_6$ is less than distance $D_5$. The taper will enable the bent flange 132 to better communicate with the mounting surface 26 and the mating feature 102.

Figure 5:
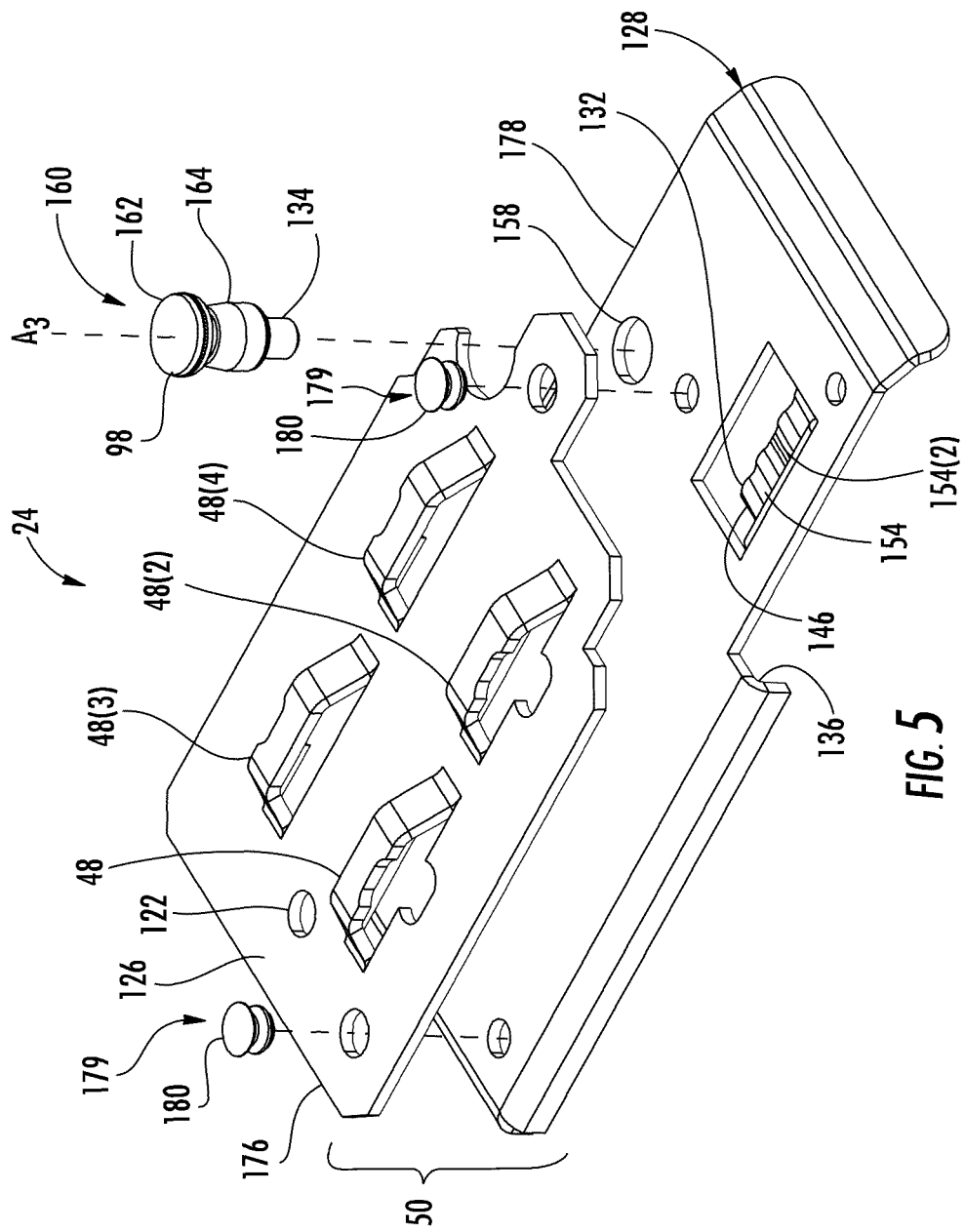
FIG. 5 is a perspective exploded view of the removable strain relief bracket of FIG. 2A.

Next, the pin 134 may and help prevent lateral movement of the removable strain relief bracket 24 of FIG. 2A with respect to the mounting surface 26. FIG. 4D shows the pin 134 which is next feature of the attachment system 100. As is shown in FIGS. 4D and 5, the pin 134 may be disposed through an orifice 158 in the body 50. The orifice 158 in the body 50 may be centered along the pin longitudinal axis $A_3$ as shown in FIG. 5 and may be receiving the pin 134 as shown in FIG. 4D. The pin 134 helps prevent the lateral movement when the removable strain relief bracket 24 is attached to the mounting surface 26 by also being disposed in the orifice 104 of the mounting surface 26, When the pin is disposed in the orifice 104 of the mounting surface 26, the location of the orifice 104 of the mounting surface 26 with respect to the orifice 158 in the body 50 is fixed. When the removable strain relief bracket 24 needs to be removed from the mounting surface 26, then the pin is removed from the orifice of the mounting surface 26 and lateral movement is possible for the removable strain relief bracket 24 with respect to the mounting surface 26.

The pin 134 may be part of a larger assembly to enable its operation without the use of tools. As shown in FIG. 5, the pin 134 may be comprised of a plunger assembly 160. In one embodiment, the plunger assembly 160 may be commercially available as a spring-loaded plunger 162, catalog number 56-99-513 from Southco, Incorporated headquartered in Concordville, Pa. The plunger assembly 160 may comprise a ferrule 164, spring 166, plunger head 98, and the pin 134.

Another feature in the removable strain relief bracket 24 may be the body 50. FIG. 5 illustrates the arrangement of the features discussed above on the body 50 of the removable strain relief bracket 24 of FIG. 2A in an exploded view. The body 50 may include a first part 176 and a second part 178. The top surface 126 and the lances 48, 48(2), 48(3), 48(4) may be included as part of the first part 176. The bent flange 132, the turn-down flanges 136, and the orifice 158 in the body 50 may be included as part of the second part 178. The first part 176 and the second part 178 may be attached together using various techniques, for example, welding, or fastening using a third fastener 179 (see FIG. 5). The third fastener 179 may be, for example, a rivet or a PEM® SpotFast® fastener 180 manufactured by PennEngineering headquartered in Danboro, Pa. The benefit of making the body 50 comprised of a first part 176 and a second part 178 may be to reduce manufacturing expense. It is generally less expensive to group features having similar bending directions on separate parts and then attach the separate parts later. The reason is that less expensive manufacturing machines may be used as opposed to more expensive manufacturing machines that could perform metal bending operations in dissimilar bending directions.

The body 50 may be made of a resilient and strong material, for example, 0.060-inch thick steel. Other materials may also be used, but preferably those that may be compatible with metal-forming operations, for example, stamping.

Next, the bent flange 132 discussed earlier may be a part of the body 50 and may have special features to enable better performance of the attachment system 100. As shown in FIGS. 6A and 6B, the bent flange 132 may be configured to communicate with the mounting surface 26 and the mating feature 102 of the mounting surface 26. Specifically, the first mating surface 146 may be configured to be received by a mating interface surface 152 of the mating feature 102, and the second mating surface 148 may be configured to be received by the mounting surface 26 as shown in FIGS. 6A and 6B. The first mating surface 146 may include non-planar features 154, 154(2) as shown in FIG. 6C and earlier in FIG. 5. The first mating surface 146 may be configured to communicate with complementary non-planar features 156, 156(2) of the mating interface surface 152 as shown in FIG. 6C. The non-planar features 154, 154(2) may be parallel to the second portion axis $A_2$ as shown in FIG. 4C. The benefit of the non-planar features 154, 154(2) is that they may be configured to prevent torsional movement of the removable strain relief bracket 24 with respect to the mounting surface 26 by forming a close communication with the complementary non-planar features 156, 156(2).

Figure 6B:
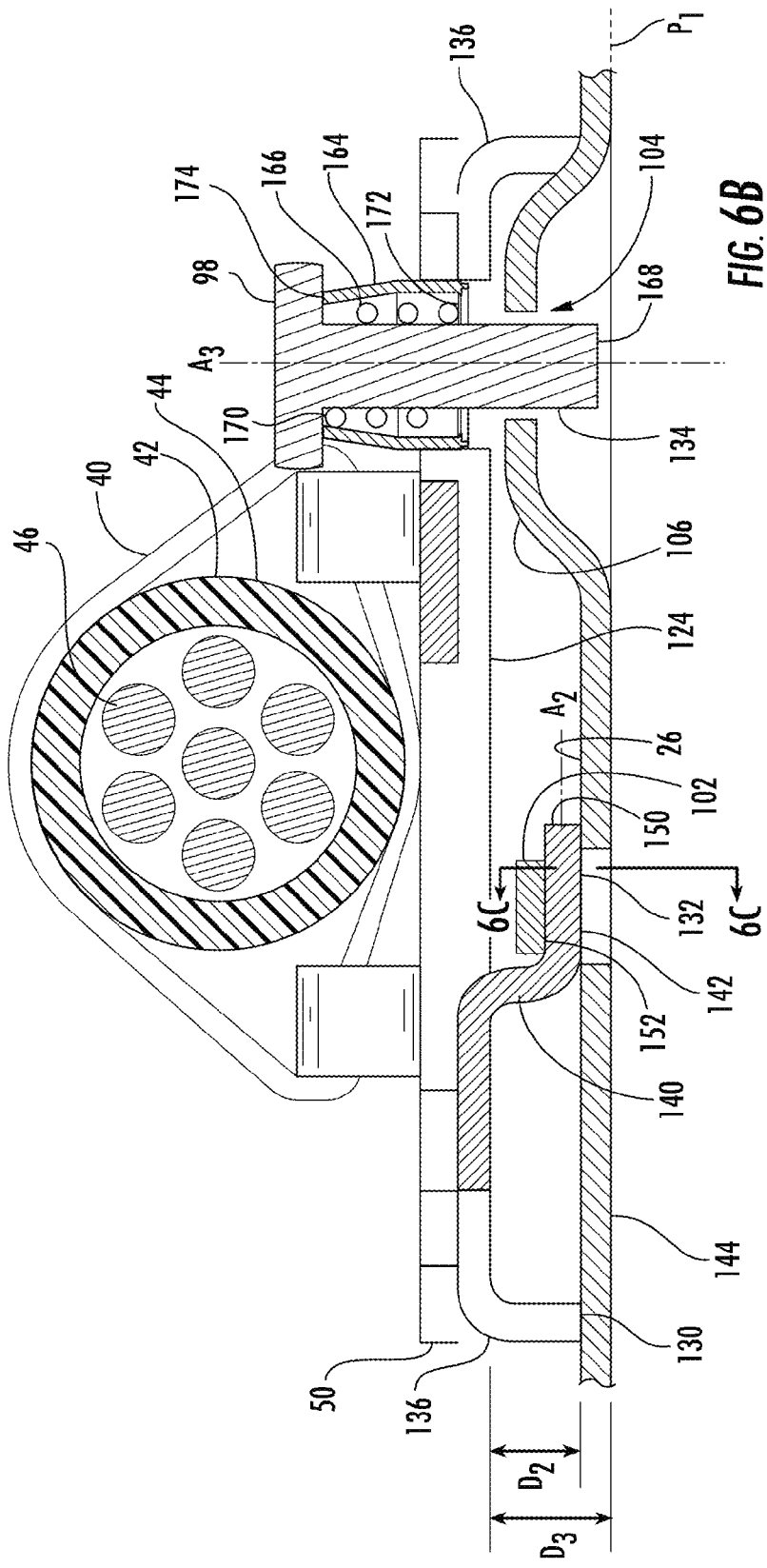
FIG. 6B is a side partial cutaway view of the removable strain relief bracket of FIG. 4E attached to the mounting surface and a fiber optic cable.
Figure 6C:
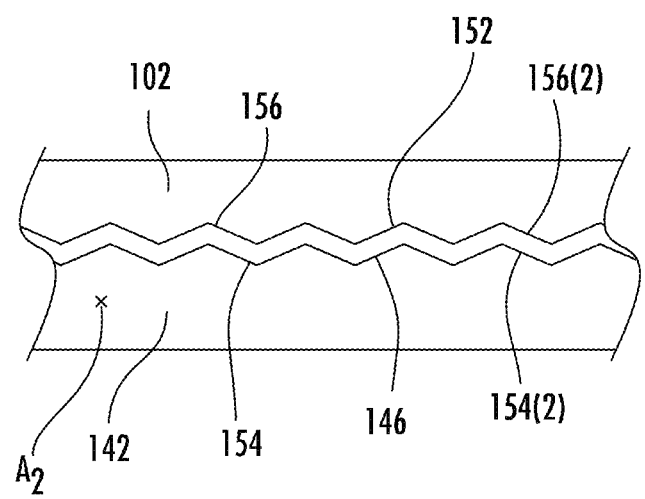
FIG. 6C is a cutaway view of a bent flange of the removable strain relief bracket of FIG. 2A in communication with a mating feature of the mounting surface of FIG. 2B.

FIGS. 6A and 6B also depict cutaway views of the ferrule 164 of the plunger assembly 160 discussed earlier. The ferrule 164 may connect the plunger assembly 160 to the body 50 and may restrict the pin 134 to move bi-directionally along the pin longitudinal axis $A_3$ and the orifice 158 in the body 50. The ferrule 164 may also serve to restrict the range of motion of the pin 134 so that a distal end 168 of the pin 134 does not extend beyond the geometric plane $P_1$ of the bottom planar surface 144 of the fiber optic equipment housing 28 to obstruct the movement of other fiber optic equipment housings 28 attached to the vertical rails as discussed earlier.

Moreover, the pin 134 of the plunger assembly 160 may be attached to the plunger head 98. The pin 134 may extend from the plunger head 98. The spring 166 may be connected to both the plunger head 98 and the ferrule 164 at a first connection point 170 and a second connection point 172 respectively as shown in FIGS. 6A and 6B. The spring 166 biases the plunger head 98 against a top ferrule surface 174 of the ferrule 164 when the distal end 168 of the pin 134 is not in contact with the mounting surface 26. The plunger head 98 may be configured to receive a manual pulling force in a direction away from the mounting surface 26 to disengage the pin 134 from the orifice 104 of the mounting surface 26. The spring 166 may be configured to insert the pin 134 into the orifice 104 of the mounting surface 26 while the at least one abutment surface 130 abuts the mounting surface 26.

The materials used to make the components of the plunger assembly 160 may be commercially available. The ferrule 164, the pin 134, and the plunger head 98 may be made of strong resilient materials, for example, low carbon steel. The spring 166 may be made of a hard corrosion-resistant material, for example, 300-series stainless steel containing at least 10% chromium.

Figure 7:
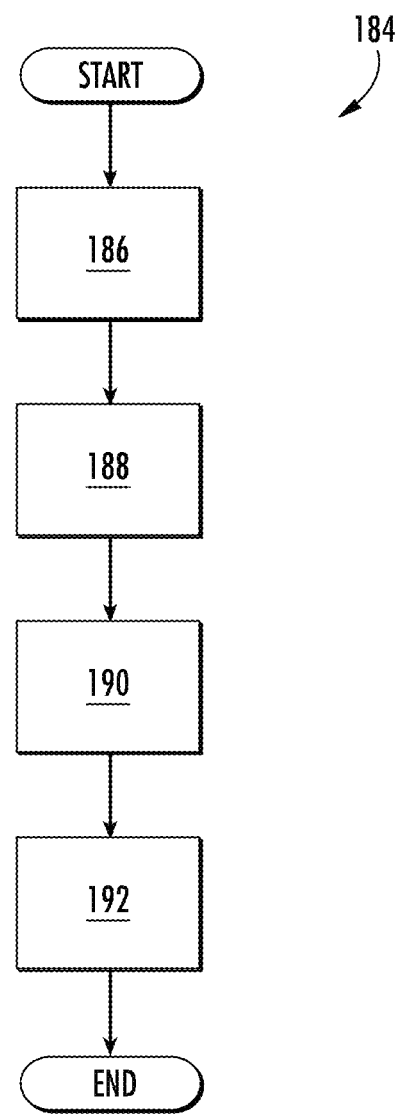
FIG. 7 is an exemplary method for securing a fiber optic cable to the fiber optic equipment housing of FIG. 2A utilizing the removable strain relief bracket of FIG. 2A.

Now that the features of the removable strain relief bracket 24 have been discussed, an exemplary method 184 of securing the end portion 94 of the fiber optic cable 44 to the fiber optic equipment housing 28 may be disclosed. In this regard, before the end portion 94 of the fiber optic cable 44 may be optically coupled to fiber optic equipment, the fiber optic cable 44 may need to be secured to provide strain relief to the fiber equipment. In one embodiment, the fiber optic equipment may be the fiber optic equipment housing 28. FIG. 7 depicts the exemplary method 184 of securing the end portion 94 of the fiber optic cable 44 to the fiber optic equipment housing 28 as depicted in FIGS. 2A through 6D. In the first step, the end portion 94 of the fiber optic cable 44 may be disposed adjacent to the at least one lance 48. The lance 48 may be raised off the body 50 of the removable strain relief bracket 24 (step 186 in FIG. 7). This step may also include preparing the fiber optic cable 44 by stripping the outer jacket 42 of the end portion 94 of the fiber optic cable 44 to expose the subunit optical fibers 46 to the transition point 96.

Next, the fastener 40 may be secured around the lance 48 of the removable strain relief bracket 24. The fastener 40 may at least partially surround the lance 48 and may be disposed around the end portion 94 of the fiber optic cable 44 (step 188 in FIG. 7).

Next, the bent flange 132 of the removable strain relief bracket 24 may be received into the mating feature 102 (step 190 in FIG. 7). The mating feature 102 may be attached to the mounting surface 26 of the fiber optic equipment housing 28 to prevent torsional movement of the removable strain relief bracket 24 with respect to the mounting surface 26.

In this step, the at least one abutment surface 130 of the removable strain relief bracket 24 may abut against the mounting surface 26 of the fiber optic equipment housing 28. The abutment surface 130 may be formed from one or more turn-down flanges 136 disposed on the body 50. The body 50 may include a bottom surface 124 configured to face the mounting surface 26. The body 50 may also include the top surface 126 opposite the bottom surface 124. The top surface 126 may be configured to face away from the mounting surface 26. The first mating surface 146 of the bent flange 132 may be received by the mating interface surface 152 of the mating feature 102. The second mating surface 148 of the bent flange 132 may be received by the mounting surface 26. The bent flange 132 may include the first portion 140 and the second portion 142. The first portion 140 may extend from the bottom surface 124. The second portion 142 may include the first mating surface 146 and the second mating surface 148 opposite the first mating surface 146. The second portion 142 may be disposed at an angle θ (theta) with respect to the first portion 140 and may extend toward a distal end 150 of the bent flange 132 along a second portion axis $A_2$. The non-planar features 154 of the first mating surface 146 may be received by the complementary non-planar features 156 of the mating interface surface 152.

Next, the pin 134 may be received in the orifice 104 of the mounting surface 26 to prevent lateral movement of the removable strain relief bracket 24 with respect to the mounting surface 26 (step 192 in FIG. 7). The abutment surface 130 may slide along the mounting surface 26 while sliding an distal end 168 of the pin 134 over the curvilinear shape 108 of the raised emboss 106 to bias the spring 166 that inserts the distal end 168 of the pin 134 into the orifice 104 of the mounting surface 26. The distal end 168 of the pin 134 may be restricted to traveling a curvilinear trajectory along the surface of the raised emboss 106.

As used herein, it is intended that terms "fiber optic cables" and/or "optical fibers" include all types of single mode and multi-mode light waveguides, including one or more optical fibers that may be up-coated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163, the disclosures of which are incorporated herein by reference in their entireties.

Many modifications and other embodiments not set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A removable strain relief bracket to secure a fiber optic cable to fiber optic equipment, comprising:

a body comprising a top side and a bottom side opposite the top side;

at least one lance raised off of the top side of the body configured to be at least partially surrounded by a fastener disposed around a fiber optic cable; and an attachment system configured to removably attach the bottom side of the body to a mounting surface of fiber optic equipment, wherein the attachment system comprises:

at least one bent flange disposed in the body and extending away from the bottom side, wherein the at least one bent flange is configured to communicate with a mounting surface opposite the bottom side.

2. The removable strain relief bracket of claim 1, wherein the attachment system comprises at least one abutment surface disposed on the body and configured to contact a mounting surface of the fiber optic equipment, and at least one pin disposed through an orifice in the body and configured to enter into and depart from an orifice in the mounting surface;

wherein the at least one bent flange is further configured to communicate with a mating feature of the mounting surface.

3. The removable strain relief bracket of claim 2, wherein the body includes a bottom surface on the bottom side configured to face the mounting surface; and a top surface on the top side opposite the bottom surface configured to face away from the mounting surface.

4. The removable strain relief bracket of claim 3, wherein the body comprises a first part and a second part, the top surface and the at least one lance are comprised of first part, and the at least one bent flange is comprised of the second part.

5. The removable strain relief bracket of claim 4, wherein the first part is welded to the second part.

6. The removable strain relief bracket of claim 3, further including a waterfall in the form of a curvilinear surface attached to the top surface and curved away from the top surface and towards the bottom surface, the waterfall is configured to manage a bend radius of a fiber optic cable connected to the removable strain relief bracket.

7. The removable strain relief bracket of claim 3, wherein the at least one lance is disposed above an opening in the body.

8. The removable strain relief bracket of claim 3, wherein the at least one lance is disposed above a top surface of the body.

9. The removable strain relief bracket of claim 3, wherein the at least one bent flange includes a first portion and a second portion, the first portion extending from the bottom surface, and the second portion comprising a first mating surface and a second mating surface opposite the first mating surface.

10. The removable strain relief bracket of claim 9, wherein the second portion is disposed at an angle with respect to the first portion and extends along a second portion axis to terminate at a distal end of the at least one bent flange.

11. The removable strain relief bracket of claim 9, wherein the first mating surface is configured to be received by a mating interface surface of the mating feature, and the second mating surface is configured to be received by the mounting surface.

12. The removable strain relief bracket of claim 11, wherein the first mating surface includes non-planar features, the first mating surface configured to communicate with complementary non-planar features of the mating interface surface.

13. The removable strain relief bracket of claim 12, wherein the non-planar features are both parallel to the second portion axis and configured to prevent torsional movement of the removable strain relief bracket with respect to the mounting surface.

14. The removable strain relief bracket of claim 12, wherein the second portion is tapered from the first part toward the distal end of the at least one bent flange.

15. The removable strain relief bracket of claim 2, wherein the at least one abutment surface is formed from one or more turn-down flanges disposed on the body.

16. The removable strain relief bracket of claim 15, wherein the one or more turn-down flanges are disposed along a perimeter of the bottom surface and turned away from the top surface.

17. The removable strain relief bracket of claim 2, wherein the at least one pin extends along a pin longitudinal axis, the at least one pin configured to prevent lateral movement of the removable strain relief bracket with respect to the mounting surface.

18. The removable strain relief bracket of claim 17, wherein the orifice in the body is centered along the pin longitudinal axis and receiving the at least one pin, and the at least one pin is restricted to move bi-directionally along the pin longitudinal axis and the orifice in the body.

19. The removable strain relief bracket of claim 18, wherein the at least one pin is comprised of a plunger assembly.

20. The removable strain relief bracket of claim 19, wherein the plunger assembly comprises a spring, and the spring is configured to insert the at least one pin into the orifice of the mounting surface while the at least one abutment surface abuts the mounting surface.

21. The removable strain relief bracket of claim 20, wherein the plunger assembly further comprises a plunger head, the plunger head is attached to the at least one pin, the at least one pin extends from the plunger head, and the plunger head is configured to receive a manual pulling force to disengage the at least one pin from the orifice of the mounting surface.

22. A fiber optic equipment, comprising:
a housing, comprising
a mounting surface,
at least one fiber optic connection optically connecting at least one optical fiber exposed from an end portion of a fiber optic cable;
an orifice disposed through the mounting surface, and
a mating feature attached to the mounting surface; and
a removable strain relief bracket configured to be removably attached to the mounting surface and configured to be attached to the end portion of the fiber optic cable, wherein the removable strain relief bracket further comprises:
an abutment surface disposed on a body and contacting the mounting surface;
a bent flange disposed in the body and received in the mating feature; and
a pin received in an orifice in the body;
wherein the bent flange includes a first portion and a second portion, the first portion extending from the bottom surface, the second portion comprising a first mating surface and a second mating surface opposite the first mating surface, the second portion is disposed at an angle with respect to the first portion and extends toward a distal end of the bent flange along a second portion axis.

23. The fiber optic equipment of claim 22, wherein the removable strain relief bracket comprises:
a body; and
at least one lance raised off the body and receiving a fastener disposed around the end portion of the fiber optic cable, the at least one lance at least partially surrounded by the fastener.

24. The fiber optic equipment of claim 22, wherein the body includes a bottom surface facing the mounting surface; and
a top surface opposite the bottom surface facing away from the mounting surface.

25. The fiber optic equipment of claim 22, wherein the first mating surface is received by a mating interface surface of the mating feature, and the second mating surface is received by the mounting surface.

26. The fiber optic equipment of claim 25, wherein the first mating surface includes non-planar features, the first mating surface communicating with complementary non-planar features of the mating interface surface.

27. The fiber optic equipment of claim 26, wherein the non-planar features are parallel to the second portion axis and prevent torsional movement of the removable strain relief bracket with respect to the mounting surface.

28. The fiber optic equipment of claim 22, wherein the second portion is tapered from the first part toward the distal end of the bent flange.

29. The fiber optic equipment of claim 22, wherein the at least one abutment surface is formed from one or more turn-down flanges disposed on the body.

30. The fiber optic equipment of claim 22, wherein the pin extends along a pin longitudinal axis, the pin configured to prevent lateral movement of the removable strain relief bracket with respect to the mounting surface.

31. The fiber optic equipment of claim 30, wherein the orifice in the body is centered along the pin longitudinal axis and receiving the pin, and the pin is restricted to move bi-directionally along the pin longitudinal axis and the orifice in the body.

32. The fiber optic equipment of claim 31, wherein the pin is comprised of a plunger assembly.

33. The fiber optic equipment of claim 32, wherein the plunger assembly comprises a spring, and the spring is configured to insert the pin into the orifice of the mounting surface while the at least one abutment surface abuts the mounting surface.

34. The fiber optic equipment of claim 33, wherein the plunger assembly further comprises a plunger head, the plunger head is attached to the pin, the pin extends from the plunger head, and the plunger head is configured to receive a manual pulling force to disengage the pin from the orifice of the mounting surface.

35. The fiber optic equipment of claim 22, wherein the mounting surface comprises a raised emboss, the raised emboss extends towards the removable mounting bracket and the orifice of the mounting surface is disposed through the raised emboss.

36. A method of securing an end portion of a fiber optic cable to fiber optic equipment, comprising:
disposing an end portion of a fiber optic cable adjacent to at least one lance, the lance raised off a top side of a body of a removable strain relief bracket opposite a bottom side;
securing a fastener around the at least one lance of the removable strain relief bracket, the fastener at least partially surrounding the lance and disposed around the end portion of the fiber optic cable; and attaching the removable strain relief bracket to a mounting surface of a fiber optic equipment, wherein the attaching the removable strain relief bracket to the mounting surface of the fiber optic equipment comprises:

receiving a bent flange extending away from the bottom side of the removable strain relief bracket, wherein the bent flange communicates with the mounting surface opposite the top side.

37. The method of claim 36, wherein the attaching the removable strain relief bracket to the mounting surface of the fiber optic equipment comprises:

receiving a bent flange of the removable strain relief bracket into a mating feature attached to a mounting surface of a fiber optic equipment housing to prevent torsional movement of the removable strain relief bracket with respect to the mounting surface.

38. The method of claim 37, wherein the receiving the bent flange further comprises abutting at least one abutment surface of the removable strain relief bracket against the mounting surface of the fiber optic equipment housing, the at least one abutment surface is formed from one or more turn-down flanges disposed on the body, wherein the body includes a bottom surface configured to face the mounting surface and a top surface opposite the bottom surface configured to face away from the mounting surface.

39. The method of claim 38, further comprising receiving a pin in an orifice of the mounting surface to prevent lateral movement of the removable strain relief bracket with respect to the mounting surface, wherein the receiving the pin in the orifice further comprises sliding the abutment surface along the mounting surface while sliding a distal end of the pin over a surface of a raised emboss to bias a spring that inserts the distal end of the pin into the orifice of the mounting surface.

40. The method of claim 39, wherein the receiving the pin in the orifice includes the distal end of the pin restricted to traveling a curvilinear trajectory along the surface of the raised emboss.

41. The method of claim 40, wherein the receiving the bent flange of the removable strain relief bracket into the mating feature further includes:

receiving a first mating surface of the bent flange by a mating interface surface of the mating feature, and receiving a second mating surface of the bent flange by the mounting surface, wherein the bent flange includes a first portion and a second portion, the first portion extending from the bottom surface, the second portion comprising the first mating surface and the second mating surface opposite the first mating surface, the second portion is disposed at an angle with respect to the first portion and extends toward a distal end of the bent flange along a second portion axis.

42. The method of claim 41, wherein the receiving the first mating surface of the bent flange by the mating interface surface of the mating feature further includes:

receiving non-planar features of the first mating surface by complementary non-planar features of the mating interface surface.

\* \* \* \* \*